(12) United States Patent
Yokota et al.

(10) Patent No.: US 7,792,295 B2
(45) Date of Patent: Sep. 7, 2010

(54) MONITORING CAMERA SYSTEM, IMAGING DEVICE, AND VIDEO DISPLAY DEVICE

(75) Inventors: Kaoru Yokota, Hyogo (JP); Motoji Ohmori, Osaka (JP); Kazuhisa Watanabe, Kanagawa (JP); Atsushi Saso, Kanagawa (JP); Mizuho Sakakibara, Tokyo (JP); Naoaki Yamamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 428 days.

(21) Appl. No.: 11/909,882

(22) PCT Filed: Apr. 20, 2006

(86) PCT No.: PCT/JP2006/308278

§ 371 (c)(1),
(2), (4) Date: Sep. 27, 2007

(87) PCT Pub. No.: WO2006/115156

PCT Pub. Date: Nov. 2, 2006

(65) Prior Publication Data

US 2009/0257589 A1  Oct. 15, 2009

(30) Foreign Application Priority Data

Apr. 25, 2005  (JP) .............................. 2005-126037

(51) Int. Cl.
H04N 7/167  (2006.01)
(52) U.S. Cl. ....................... 380/210; 380/277
(58) Field of Classification Search ................. 380/200, 380/210, 216, 277
See application file for complete search history.

(56) References Cited

U.S. PATENT DOCUMENTS

2002/0149681 A1* 10/2002 Kahn et al. ............ 348/211.99
2003/0044046 A1   3/2003 Nakamura et al.
2003/0091239 A1   5/2003 Imagawa et al.

(Continued)

FOREIGN PATENT DOCUMENTS

EP            1 311 124          5/2003

(Continued)

OTHER PUBLICATIONS

International Search Report issued Aug. 1, 2006 in the International (PCT) Application of which the present application is the U.S. National Stage.

*Primary Examiner*—David García Cervetti
(74) *Attorney, Agent, or Firm*—Wenderoth, Lind & Ponack, L.L.P.

(57) ABSTRACT

This relates to an imaging device in which the necessary monitoring of an individual can be realized, while still maintaining protection of an individual's privacy. The imaging device includes an encryption key storage unit in which encryption key data is stored for an individual, an object judging unit operable to judge whether or not the captured video is of the individual, and a limited-capture video generation unit operable to (i) convert a part of the captured video that includes the individual into encrypted video, (ii) generate limited-capture video, which includes the encrypted video, when said object judging unit judges that the captured video includes the individual, and (iii) output the captured video, which does not include the encrypted video, when said object judging unit judges that the captured video does not include the individual.

16 Claims, 18 Drawing Sheets

U.S. PATENT DOCUMENTS

| | | |
|---|---|---|
| 2004/0036767 A1 | 2/2004 | Yajima |
| 2004/0081338 A1* | 4/2004 | Takenaka .................... 382/118 |
| 2004/0085445 A1* | 5/2004 | Park .......................... 348/143 |
| 2004/0085446 A1* | 5/2004 | Park .......................... 348/143 |
| 2005/0011959 A1* | 1/2005 | Grosvenor ................. 235/470 |
| 2005/0111660 A1* | 5/2005 | Hosoda ....................... 380/44 |
| 2005/0175104 A1* | 8/2005 | Honda et al. ........... 375/240.18 |
| 2005/0264658 A1* | 12/2005 | Ray et al. ................... 348/239 |
| 2006/0056625 A1* | 3/2006 | Nakabayashi et al. ......... 380/46 |

FOREIGN PATENT DOCUMENTS

| | | |
|---|---|---|
| EP | 1 388 802 | 2/2004 |
| JP | 2002-281486 | 9/2002 |
| JP | 2003-179912 | 6/2003 |
| JP | 2003-219383 | 7/2003 |
| JP | 2004-062560 | 2/2004 |
| JP | 2004-080669 | 3/2004 |

* cited by examiner

FIG. 4

| Video display device identifier | Device key |
|---|---|
| IDa | Ka |
| IDb | Kb |
| IDc | Kc |
| ⋮ | ⋮ |

FIG. 8
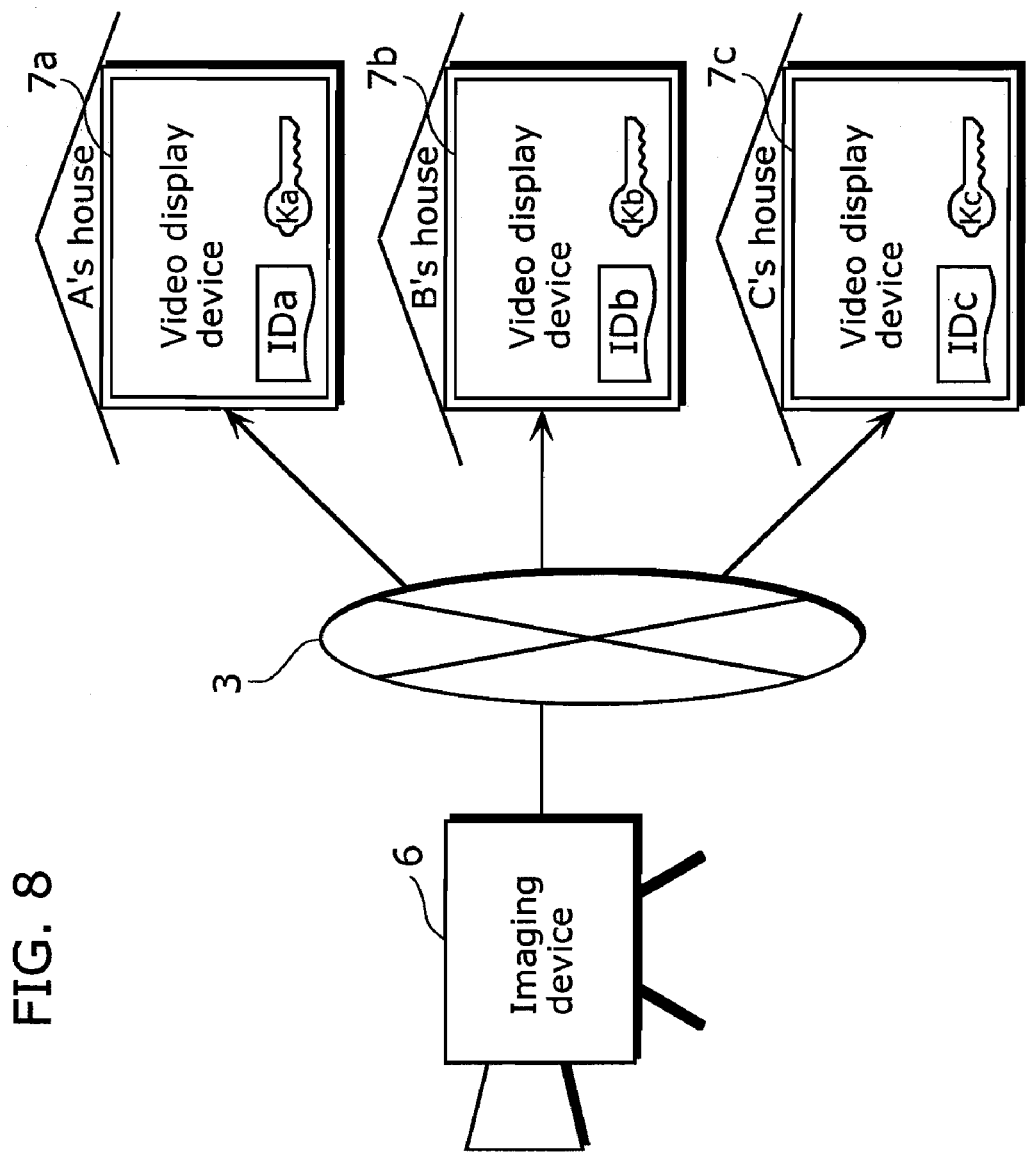
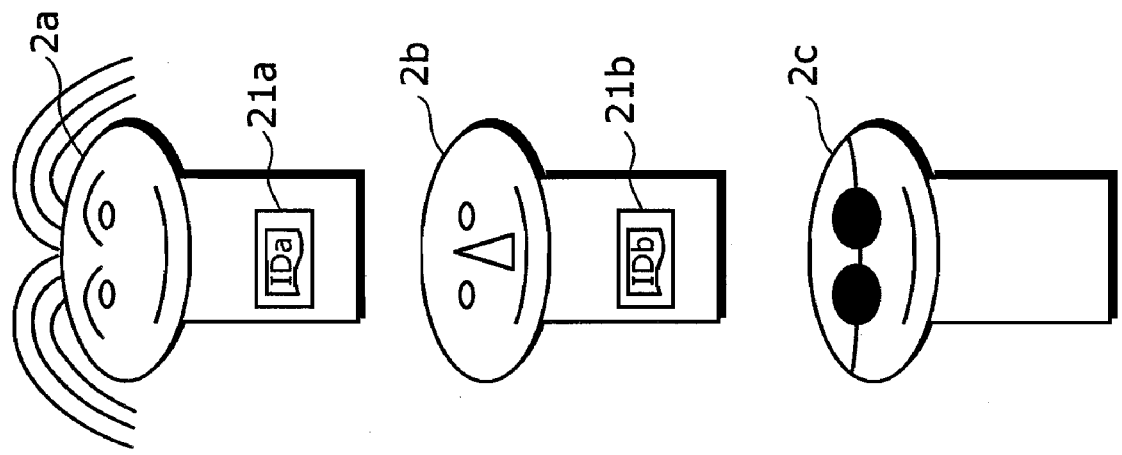

MONITORING CAMERA SYSTEM, IMAGING DEVICE, AND VIDEO DISPLAY DEVICE

TECHNICAL FIELD

The present invention relates to a monitoring camera system with which privacy of an object is adequately ensured and monitoring by a monitoring camera is possible.

BACKGROUND ART

In recent years, a monitoring camera has been installed in an apartment, a house, and the like, so as to prevent a suspicious individual from intruding into a building. In addition, the monitoring camera is mainly installed at a street corner, in a park, and the like, of a new town, so that neighborhood residents can watch a monitored image inside. In this way, a parent, being at home, can check on a child playing in the park and the like so that the parent can let the child play outside without a fear.

On the other hand, a widespread use of the monitoring camera may bring about a privacy issue. That is to say, people are subject to monitoring by the monitoring camera installed at various places in town or in the park. As a result, there is a chance that a third person may constantly follow each person's movements.

Therefore, it is desired that a mechanism achieves not only a maintenance of security and a sense of safety by installing the monitoring camera but also a protection of privacy of the object monitored by the above-mentioned monitoring camera.

As one of systems for realizing such mechanism, there is a monitoring camera system disclosed in a Patent Reference 1.

According to the system described in the Patent Reference 1, a specific person's face image is previously registered on the system. In the case where the registered face image is detected in monitored video of the monitoring camera, video in which the face image is obscured by a mosaic is outputted to a video display device of the monitoring camera system.

According to this system, registering face images of people (e.g. house, apartment, or neighborhood residents) who do not want to be monitored by the monitoring camera allows all the people's face images in a monitored image to be obscured by the mosaic. This way, as the house, apartment, or neighborhood residents' faces are designed not to be shown in the monitored video, the residents' privacy can be protected.

Patent Reference 1: Japanese Unexamined Patent Application Publication No. 2004-62560.

DISCLOSURE OF INVENTION

Problems that Invention is to Solve

However, the above-mentioned conventional technology has faced with a problem that a monitoring function necessary in the following application pattern and a protection of privacy of an object are incompatible.

For example, an application pattern in which monitoring from a house and the like by a parent aims at ensuring safety of a child in a neighborhood or a park in an apartment is considered. In this case, the parent should always be able to view the child in a monitored video. But, on the other hand, from a point of view of protecting the privacy, it is undesirable that the monitored video of the child is viewed by other residents in the neighborhood or of the apartment. That is to say, there is a need to realize that a family member of a resident A in a monitored video can be viewed with a video display device of the resident A but not with a video display device of other people, which cannot be realized with the conventional technology.

The present invention aims at solving the above-mentioned problem, having an object of providing a monitoring camera system with which the privacy of the object can be adequately protected and the necessary monitoring function in the above-mentioned application pattern can be also realized.

Means to Solve the Problems

According to the monitoring camera system of the present invention, the monitoring camera system includes an imaging device which captures an object and distributes captured video and a video display device which receives the captured video to display it. The imaging device includes: a capturing unit which captures the object; an encryption key storage unit which stores, for each object, encryption key data which is associated with the video display device that is permitted to display captured video in which the object is included; an object judging unit which judges whether or not a specific object, which is an object associated with the video display device, is included in the captured video; a limited-capture video generation unit which converts at least partial video of the specific object in the captured video into encrypted video by encrypting the partial video using encrypting key data associated with the video display device for the specific subject, and generates limited-capture video which includes the encrypted video, when it is judged by the object judging unit that the specific object is included; and a video distribution unit which distributes the limited-capture video to the video display device. The video display device includes: a reception unit which receives the limited-capture video; a decryption key storage unit which stores decryption key data which is associated with the video display device; and a video decryption unit which generates decrypted video by decrypting the encrypted video included in the limited-capture video using the decryption key data.

According to this configuration, in the case where it is judged that the specific object, which is the object associated with the video display device, is included in the captured video, the partial image of the specific object is encrypted using the encryption key data associated with the video display device for the specific subject. As a result, in the case where the object associated with the video display device is displayed, limited-capture video can be decrypted using decryption key data for viewing with the video display device which has received the limited-capture video; however, in the case where only other object is displayed, the limited-capture video cannot be decrypted for viewing. Consequently, a viewer of the decrypted video, respecting other people's privacy, can monitor only an object which the viewer wants to monitor. Therefore, it is possible to provide a monitoring camera system with which the privacy of the object can be adequately protected and the necessary monitoring function can also be realized.

According to the other aspects of the present invention, an imaging device captures an object and distributes captured video. The imaging device includes: a capturing unit which captures the object; an encryption key storage unit which stores, for each object, encryption key data which is associated with the video display device that is permitted to display captured video in which the object is included; an object judging unit which judges whether or not a specific object, which is an object associated with the video display device, is included in the captured video; a limited-capture video generation unit which converts at least partial video of the specific object in the captured video into encrypted video by encrypting the partial video using encrypting key data associated with the video display device for the specific subject, and generates limited-capture video which includes the encrypted video, when it is judged by the object judging unit that the specific object is included; and a video distribution unit which distributes the limited-capture video to the video display device.

It is preferable that the limited-capture video generation unit includes: a key generation unit which generates video encryption key data; a captured video encryption unit which converts at least partial video of the specific object in the captured video into the encrypted video by encrypting the partial video using the video encryption key data generated by the key generation unit, when it is judged by the object judging unit that the specific object is included; a video key encryption unit which converts the video encryption key data generated by the key generation unit into encrypted video encryption key data by encrypting using the encryption key data associated with the video display device for the specific object; and a generation unit which generates the limited-capture video that includes the encrypted video generated by the video encryption unit and the encrypted video encryption key data generated by the video encryption unit.

It is designed that a video encryption key is encrypted using the encryption key data associated with the video display device for the specific object. For this reason, in the case where there are plural video display devices which distribute the limited-capture video, it is not necessary to generate the encrypted video for each video display device. Consequently, it is possible to reduce a data size of the limited-capture video to be distributed by the video distribution unit.

In addition, it is possible that the limited-capture video generation unit includes: a conversion unit which converts the specific object video which is video of the specific object in the captured video into encrypted specific object video by encrypting using the encryption key data associated with the video display device for the specific object, when it is judged by the object judging unit that the specific object is included; a background video generation unit which generates background video in which the specific object video is removed from the captured video, when it is judged by the object judging unit that the specific object is included; and a generation unit which generates the limited-capture video that includes the encrypted specific object video generated by the conversion unit and the limited-capture video including the background video generated by the background video generation unit.

Even in the case where plural specific objects are visible during capturing, it is possible to generate object limited-capture video for each specific object. For this reason, it is possible to design that a video display device which has received the limited-capture video can decrypt only certain specific object video but cannot decrypt other specific object video, even though the certain specific object video and other object video are in the same video. This way, a viewer of the decrypted video, respecting other people's privacy, can monitor only an object which the viewer wants to monitor. Therefore, it is possible to provide a monitoring camera system with which the privacy of the object can be adequately protected and the necessary monitoring function can also be realized.

It should be noted that the present invention can be realized not only as the imaging device and the like including characteristic units, but also as an imaging method and the like using, as steps, the characteristic units included in the imaging device and the like, and additionally as a program causing a computer to execute the steps included in the imaging method and the like. Furthermore, it is needless to say that such program can be distributed via recording medium, such as Compact Disc-Read Only Memory (CD-ROM) and the like, and a communication network, such as the Internet and the like.

DISCLOSURE OF INVENTION

According to the monitoring camera system of the present invention, it is possible to designate a video display device with which a monitored video can be viewed in accordance with an object in the monitored video and to distribute the monitored video. Consequently, there is an effect that the monitoring camera system can help protect the privacy of the object adequately and also realize the necessary monitoring function.

BRIEF DESCRIPTION OF DRAWINGS

FIG. 4 is a view showing an example of a list stored in a device key list storage unit.

FIG. 8 is a block diagram showing a configuration of a monitoring camera system according to a second embodiment of the present invention.

NUMERICAL REFERENCES

Figure 1:
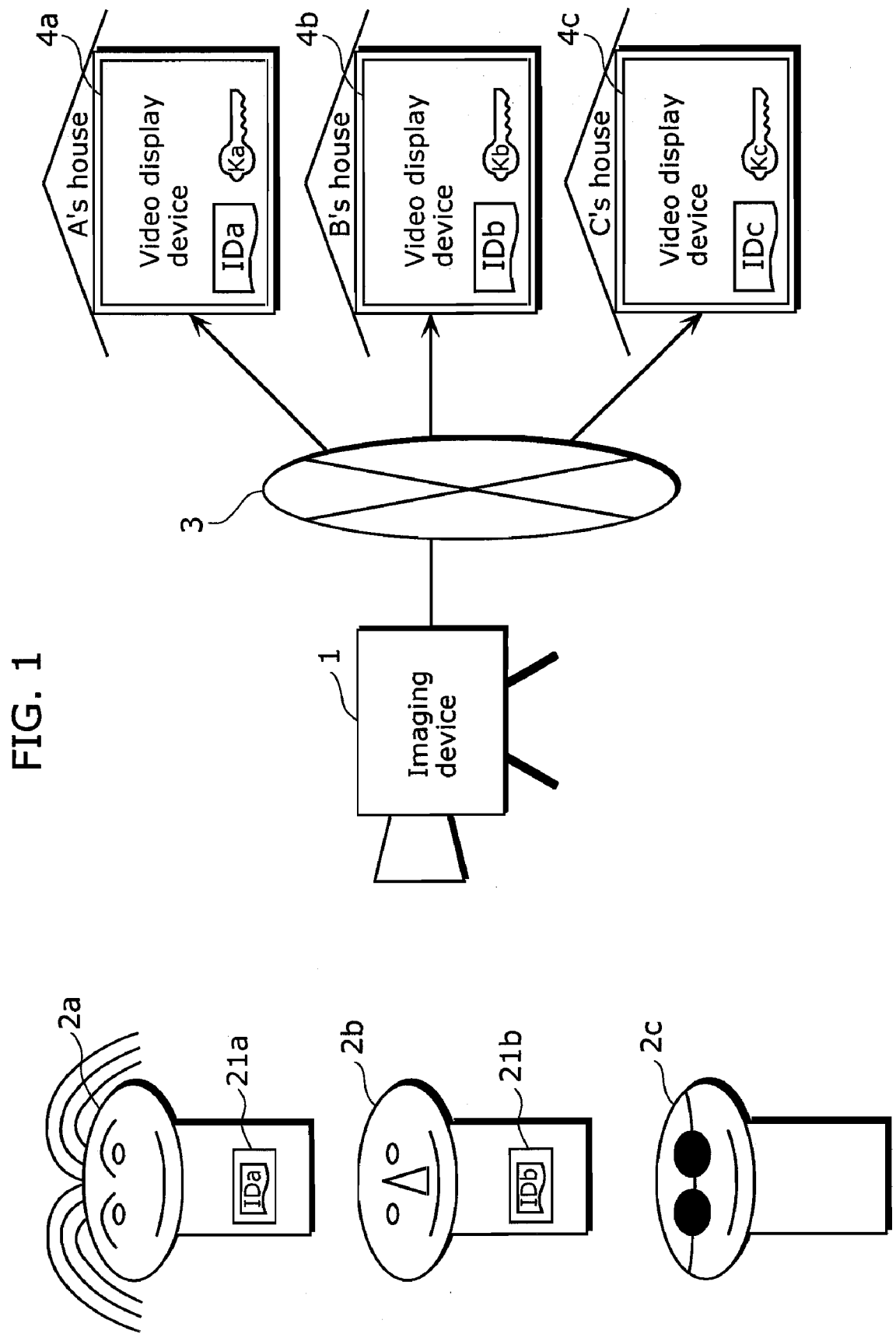
FIG. 1 is a block diagram showing a configuration of a monitoring camera system according to a first embodiment of the present invention.

1 Imaging device
2a to 2c Object
3 Network
4a to 4c, 7a to 7c Video display device
5 Encrypted video data
6 Imaging device
10, 60 Imaging unit
11, 61 Video processing unit
12, 62 Communication unit
13 Encryption key list storage unit
14 Encryption key acquisition unit
15 Video encryption unit
16, 69 Video transmission unit
21a, 21b ID tag
40, 70 Video reception unit
41, 71 Device key storage unit
42 Video decryption unit
43, 74 Video display unit
51a First video display device identifier
51b First encrypted content key data
51c Second video display device identifier
51d Second encrypted content key data
52 Encrypted content data
63 Face image list storage unit
64 Face image acquisition unit
65 Face video separation unit
66 Device key list storage unit
67 Device key acquisition unit
68 Face video encryption unit
72 Face video decryption unit
73 Video synthesis unit
90 Frame image
91 Background image
92a First extracted face image
92b Second extracted face image

BEST MODE FOR CARRYING OUT THE INVENTION

First Embodiment

The following describes a first embodiment of the present invention with reference to the drawings.

(Summary of Monitoring Camera System) FIG. 1 is a block diagram showing a configuration of a monitoring camera system according to a first embodiment of the present invention. The monitoring camera system is a system in which privacy of a predetermined object is protected and the object is monitored, and includes an imaging device 1 and video display devices 4a, 4b, and 4c connected via a network 3.

Here, the imaging device 1 is assumed to capture objects 2a, 2b, and 2c. Moreover, it is assumed that the object 2a and the object 2b possess an identification (ID) tag 21a and an ID tag 21b respectively and that the object 2c does not possess an ID tag.

In the monitoring camera system, the imaging device 1 captures the objects 2a, 2b, and 2c. The imaging device 1 distributes captured video via the network 3 to the video display devices 4a, 4b, and 4c. The following describes this procedure in detail.

(Setup of Monitoring Camera System) The video display devices 4a, 4b, and 4c are provided with video display device identifiers IDa, IDb, and IDc respectively. Furthermore, when the monitoring camera system is launched, the video display devices 4a, 4b, and 4c are provided with device keys Ka, Kb, and Kc that are respectively different from each other.

The imaging device 1 stores a list in which the video display device identifiers and the device keys are associated so as to manage the device keys provided to the video display devices. Moreover, ID tags in which each video display device identifier is stored are distributed to managers of each video display device. This ID tag may be given to and possessed by a person whom a manger of a video display device wants to monitor with the video display device managed by the manager. For example, a case where the manager is a parent in each household and a person that the manager wants to monitor is the manager's child may be considered.

In FIG. 1, it is assumed that the ID tag 21a in which the video display device identifier IDa is stored is possessed by the object 2a and that the ID tag 21b in which the video display device identifier IDb is stored is possessed by the object 2b. The ID tags wirelessly communicate with the imaging device 1, and transmit the video display device identifiers to the imaging device 1.

Next, the following process procedure is described: the imaging device 1 captures an object; monitored video obtained by capturing is distributed to the video display devices 4a to 4c; and finally the distributed monitored video is browsed with the video display device 4a to 4c.

Figure 2:
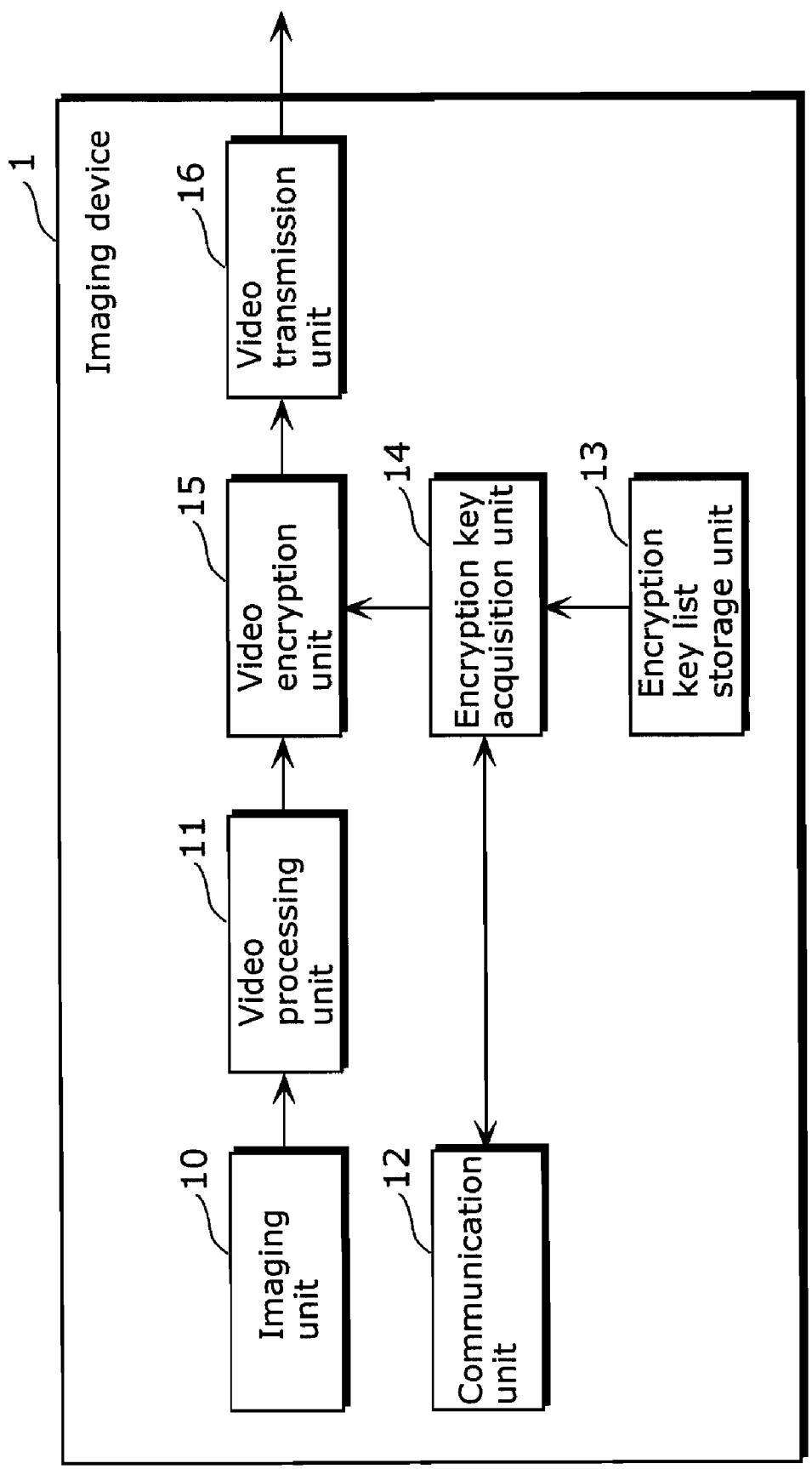
FIG. 2 is a block diagram showing a configuration of an imaging device according to a first embodiment of the present invention.

(Configuration and Operation of Imaging Device 1) FIG. 2 is a block diagram showing a configuration example of the imaging device 1. The imaging device 1 is a device which captures an object and distributes video obtained by capturing to a video display device, and includes an imaging unit 10, a video processing unit 11, a communication unit 12, an encryption key list storage unit 13, an encryption key acquisition unit 14, a video encryption unit 15, and a video transmission unit 16.

Composed of a lens and a pickup device, the imaging unit 10 is a process unit which converts light received via the lens from the object into electric charge and eventually outputs it as a digital video signal.

The video processing unit 11 is a process unit which performs image processing on the digital video signal outputted from the imaging unit 10 and outputs it as digital video data.

The communication unit 12 is a process unit which receives a video display device identifier from an ID tag while the object is being captured.

The encryption key list storage unit 13 is a storage unit which stores, as a list, device keys and video display device identifiers held by each video display device.

The encryption key acquisition unit 14 is a process unit which acquires a necessary device key from the encryption key list storage unit 13.

The video encryption unit 15 is a process unit which encrypts the digital video data outputted by the video processing unit using the device key acquired from the encryption key acquisition unit 14.

The video transmission unit 16 is a process unit which distributes monitored video including the encrypted digital video data to the video display devices 4a to 4c.

Figure 3:
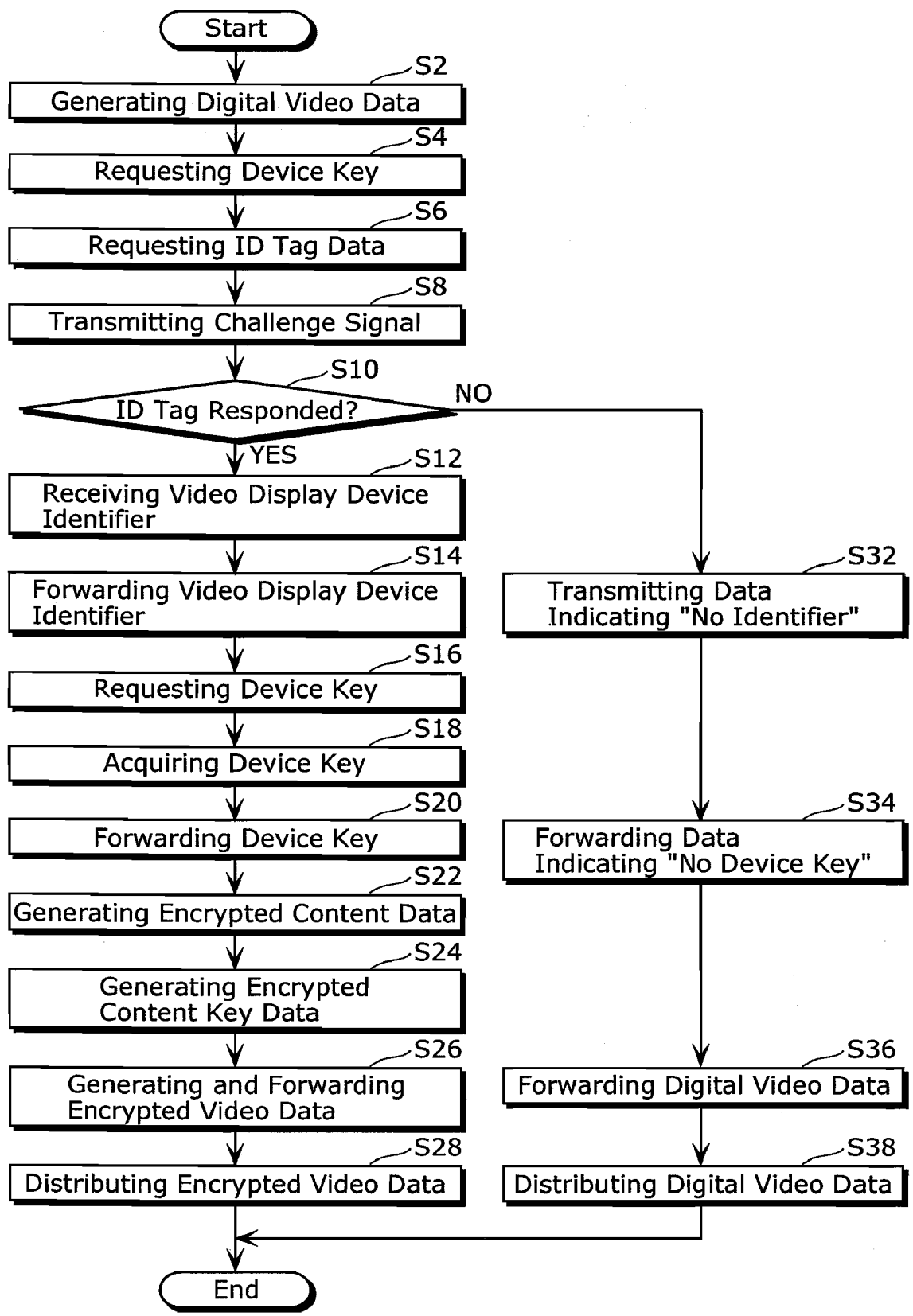
FIG. 3 is a flow chart of a process performed by an imaging device.

Hereinafter, a process in which the imaging device 1 captures the object and then distributes monitored video to the video display devices 4a to 4c is described. FIG. 3 is a flow chart of a process performed by the imaging device 1.

The imaging unit 10 receives the light via the lens from the objects 2a, 2b, and 2c, converts it into the electric charge, and generates the digital video signal through processes such as sampling and automatic gain adjustment. After that, the digital video signal is forwarded to the video processing unit 11.

The video processing unit 11 performs the image processing on the digital video signal and generates the digital video data (S2). After that, the video processing unit 11 forwards the digital video data to the video encryption unit 15. At this time, the video processing unit 11 divides the digital video data into each predetermined number of frames. Here, the digital video data divided into each predetermined number of the frames is called digital video data M1, M2, M3, ... along a time series. The video processing unit 11 forwards the digital video data, in order of the digital video data M1, M2, and M3, to the video encryption unit 15 at a predetermined time interval.

Every time the video encryption unit 15 receives digital video data Mn (n=1, 2, 3, 4, ...), it sends a device key request to the encryption key acquisition unit 14 (S4).

In response to the device key request, the encryption key acquisition unit sends an ID tag data request to the communication unit 12 (S6).

Having an ID tag reader function, the communication unit 12 transmits a challenge signal of the ID tag in response to the ID tag data request (S8). The communication unit 12 receives tag data from the ID tag which has responded to the challenge signal (YES in S10, and S12). Here, the "tag data" is data held within by the ID tag, that is, the video display device identifier. In the case where plural ID tags responded to the challenge signal (YES in S10), the communication unit 12 receives the tag data (video display device identifiers) from all the ID tags responded (S12).

The communication unit 12 forwards, to the encryption key acquisition unit 14, all the video display device identifiers received from the ID tags. It should be noted that in the case where there is no ID tag responding to the challenge signal transmitted by the communication unit 12 (NO in S10), the communication unit 12 transmits data indicating "no identifier" as the video display device identifier to the encryption key acquisition unit 14 (S32). According to an example shown by FIG. 1, the communication unit 12 receives, from the ID tags 21a and 21b possessed respectively by the objects 2a and 2b, the video display device identifiers IDa and IDb.

The encryption key acquisition unit 14 sends the device key request by forwarding the received video display device identifier to the device key list storage unit 13 (S16). However, in the case where the data indicating "no identifier" was received from the communication unit 12, the request is not sent. In the example of FIG. 1, the encryption key acquisition unit forwards the video display device identifiers IDa and IDb to the encryption key list storage unit 13.

Regarding all the video display devices registered in the monitoring camera system, the encryption key list storage unit 13 stores, as a list, pairs of a video display device identifier and a device key. FIG. 4 is a view showing an example of the list stored in the encryption key list storage unit 13. As shown by the view, the list includes a pair of the video display device identifier IDa and the device key Ka, a pair of the video display device identifier IDb and the device key Kb, and a pair of the video display device identifier IDc and the device key Kc.

The encryption key list storage unit 13 receives the video display device identifier transmitted from the encryption key acquisition unit 14, searches the list, and forwards the device key corresponding to the identifier to the encryption key acquisition unit 14 (S18). It should be noted that, when having received plural video display device identifiers, the encryption key list storage unit 13 searches device keys corresponding to each video display device identifier and forwards the all device keys to the encryption key acquisition unit 14. In the example of FIG. 1, the encryption key storage unit 13 forwards the device keys Ka and Kb corresponding to the video display device identifiers IDa and IDb to the encryption key acquisition unit 14.

The encryption key acquisition unit 14 forwards the device keys received from the encryption key list storage unit 13, together with the video display device identifiers, to the video encryption unit 15 (S20). However, when having received the data indicating "no identifier" from the communication unit 12, the encryption key acquisition unit 14 forwards, to the video encryption unit 15, data indicating "no device key" instead of the device keys and the video display device identifiers (S34). In the example of FIG. 1, the encryption key acquisition unit 14 forwards, to the video encryption unit 15, the device keys Ka and Kb and the video display device identifiers IDa and IDb.

The video encryption unit 15 encrypts the digital video data Mn, as described below, using the device key received from the encryption key acquisition unit 14. First, the video encryption unit 15 randomly generates a content key Kcont, encrypts the digital video data Mn using the content key Kcont, and generates encrypted content data (S22). Next, the video encryption unit 15 encrypts the content key Kcont using the device key received from the encryption key acquisition unit 14, and generates encrypted content key data (S24). At this time, in the case where plural device keys were received from the encryption key acquisition unit 14, encrypted content key data encrypted by each device key is generated. In the example of FIG. 1, the video encryption unit 15 generates an encrypted content key which is a content key Kcont encrypted using the device key Ka and an encrypted content key which is a content key Kcont encrypted using the device key Kb.

Figure 5:
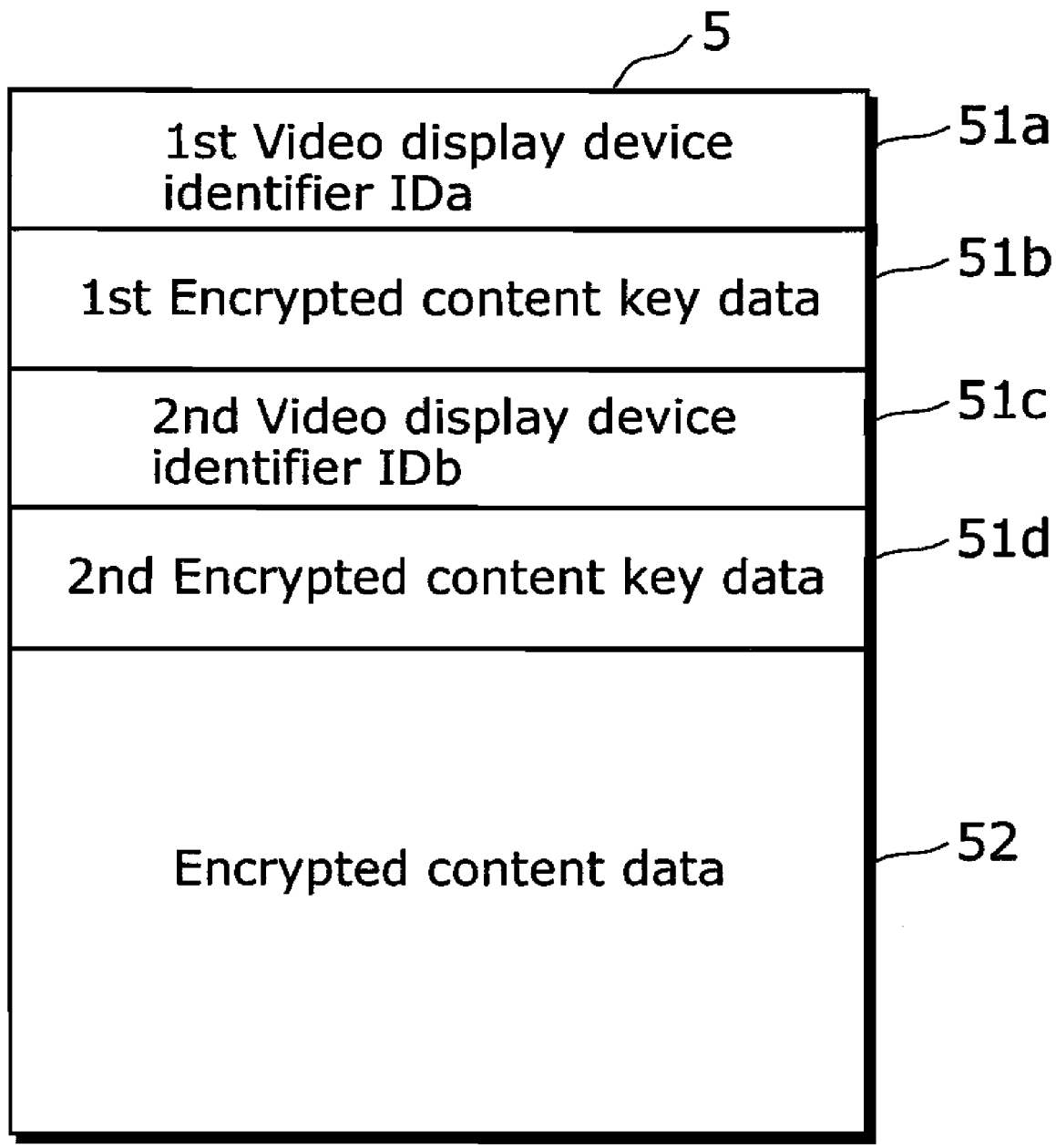
FIG. 5 is a block diagram showing a configuration of encrypted video data according to a first embodiment of the present invention.

The video encryption unit forwards, to the video transmission unit 16, encrypted video data Cn composed of the generated encrypted content keys, the display device identifiers, and the encrypted content data. In the example of FIG. 1, the video encryption unit 15 generates encrypted video data 5 as shown by FIG. 5. The encrypted video data 5 includes: the first video display device identifier (IDa) 51a; the first encrypted content key data 51b which is the content key Kcont encrypted using the device key Ka; the second video display device identifier (IDb) 51c; the second encrypted content key data 51d which is the content key Kcont encrypted using the device key Kb; and encrypted content data 52 which is the digital video data Mn encrypted using the content key Kcont. It should be noted that, when having received the data indicating "no device key" from the encryption key acquisition unit 14, the video encryption unit 15 forwards the digital video data Mn as-is to the video transmission unit 16 (S36).

The video transmission unit 16 distributes, via the network 3 to the video display devices 4a, 4b, and 4c, the encrypted video data Cn received from the video encryption unit 15 or the digital video data Mn (S28 and S38).

Figure 6:
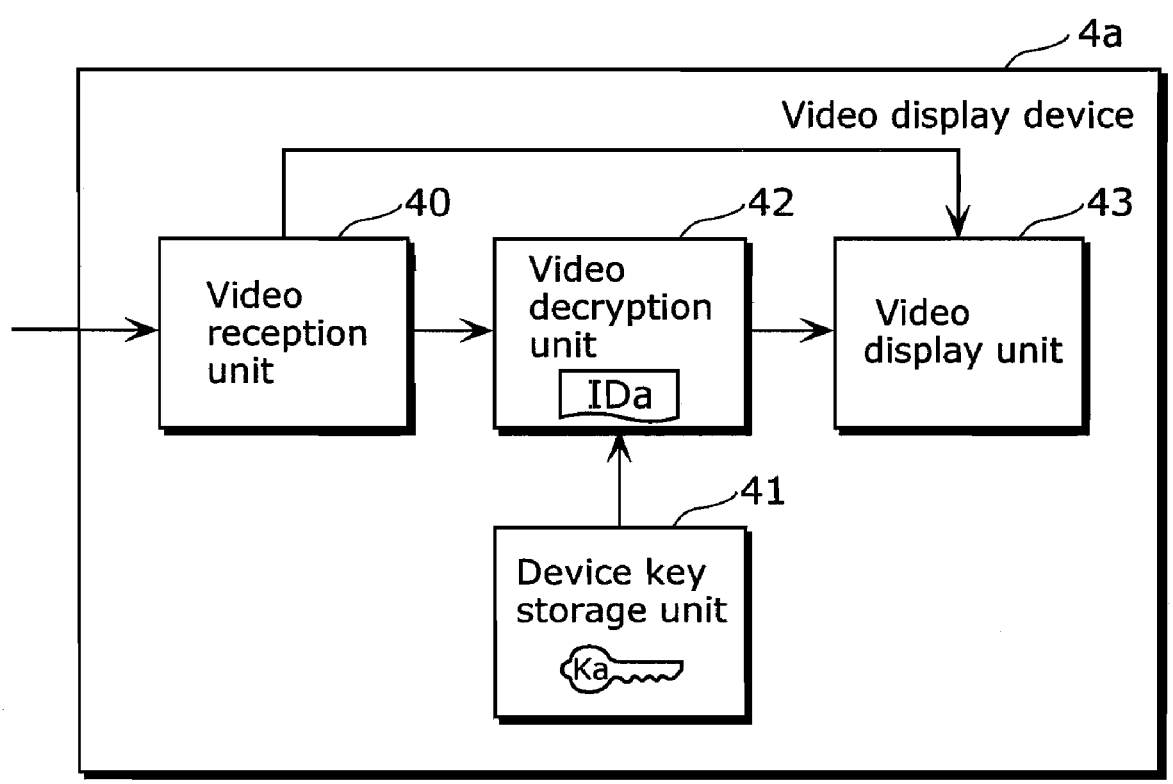
FIG. 6 is a block diagram showing a configuration of a video display device according to a first embodiment of the present invention.

(Configuration and Operation of Video Display Device 4a)
Next, a configuration and an operation of the video display devices 4a, 4b, and 4c which receive, from the imaging device 1, the encrypted video data Cn or the digital video data Mn are described with reference to FIG. 6. As the internal configuration of the video display devices 4a, 4b, and 4c is the same, the video display device 4a is described here.

The video display device 4a is a device which displays the video distributed from the imaging device 1, and includes a video reception unit 40, a device key storage unit 41, a video decryption unit 42, and a video display unit 43.

The video reception unit 40 is a process unit which receives, from the imaging device 1, the encrypted video data Cn or the digital video data Mn.

The device key storage unit 41 is a storage unit which stores a device key of the video display device 4*a*.

The video decryption unit 42 is a process unit which generates the digital video data by decrypting the encrypted video data Cn received by the video reception unit 40.

The video display unit 43 is a process unit which displays the digital video data received by the video reception unit 40 or the digital video data Mn generated in the video decryption unit 42.

Figure 7:
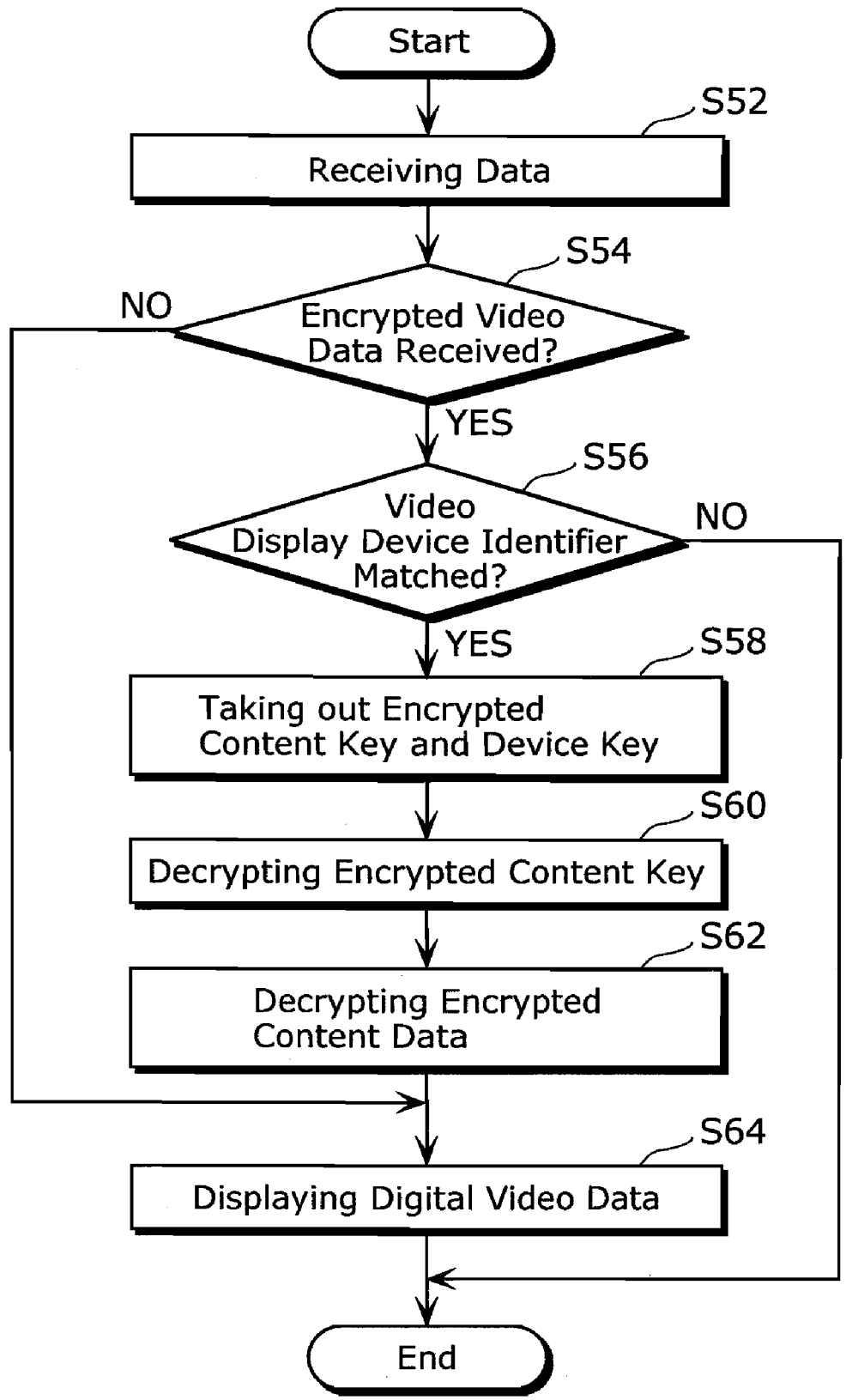
FIG. 7 is a flow chart of a process performed by a video display device.

Hereinafter, a process performed by the video display device 4*a* is described. FIG. 7 is a flow chart of the process performed by the video display device 4*a*.

The video reception unit 40 receives data from the imaging device 1 (S52). In the case where the received data is the digital video data Mn (n=1, 2, 3, ...) (NO in S54), every time the video reception unit 40 receives the digital video data Mn, it transmits the received digital video data Mn to the video display unit 43. The video reception unit 40 displays the received digital video data Mn (S64).

In the case where the received data is the digital video data Cn (n=1, 2, 3, ...) (YES in S54), every time the video reception unit 40 receives the encrypted video data Cn, it forwards the encrypted video data Cn to the video decryption unit 42.

The video decryption unit 42 holds its own video display device identifier internally. For example, the video decryption unit 42 of the video display device 4*a* holds the video display device identifier IDa.

When having received the encrypted video data Cn from the video reception unit 40 (YES in S54), the video decryption unit 42 searches whether or not a video display device identifier included in the encrypted video data corresponds to the video display device identifier held within.

In the case where nothing corresponds (NO in S56), it is judged that the received encrypted video data Cn cannot be decrypted by the video display device 4*a*; and the following process is cancelled.

In the case where those which correspond are included (YES in S56), the video decryption unit 42 takes out, from the encrypted video data Cn, the encrypted content key data corresponding to the video display device identifier IDa held within. Moreover, the video decryption unit 42 reads the device key Ka from the device key storage unit 41 (S58). After that, the video decryption unit 42 seeks the content key Kcont by decrypting the encrypted content key data included in the encrypted video data Cn using the device key Ka (S60). Furthermore, the video decryption unit 42 seeks the digital video data Mn by decrypting the encrypted content data included in the encrypted video data Cn using the content key Kcont (S62). The video decryption unit 42 forwards the sought digital video data Mn to the video display unit 43. When the video reception unit 40 receives the encrypted video data 5 shown in FIG. 5, the encrypted video data 5 includes the first video display device identifier 51*a* corresponding to the video display device identifier IDa held by the video decryption unit 42. For this reason, the video decryption unit 42 acquires the first encrypted content key data 51*b* corresponding to the first video display device identifier 51*a*. After that, the video decryption unit 42 seeks the content key Kcont by decrypting the first encrypted content key data 51*b* using the device key Ka stored in the device key storage unit 41. In addition, the video decryption unit 42 seeks the digital video data Mn by decrypting the encrypted content data 52 using the content key Kcont (S62).

The video display unit 43 displays the digital video data Mn received from the video decryption unit 42 in such a way that a viewer of the monitored video can browse (S64).

The encrypted video data 5 shown by FIG. 5 includes: the first video display device identifier IDa (51*a*) and the second video display device identifier IDb (51*c*); and the first encrypted content key data 51*b* and the second encrypted content key data 51*d* that correspond to those respectively. For this reason, the video display devices 4*a* and 4*b* can seek a content key from the encrypted content key data using the device keys Ka and Kb respectively held within. However, the encrypted video data 5 does not include the encrypted content key data which can be decrypted with the device key Kc held by the video display device 4*c*. For this reason, the video display device 4*c* cannot seek the content key. That is to say, the video display device 4*c* cannot obtain the digital video data.

This shows that the digital video data Mn in which the object 2*a* possessing the ID tag 21*a* that stores the video display device identifier IDa and the object 2*b* possessing the ID tag 21*b* that stores the video display device identifier IDb can be browsed with only the video display device 4*a* and the video display device 4*b* but not with the video display device 4*c*.

For example, in FIG. 1, it is assumed that the video display device 4*a*, 4*b*, and 4*c* are put at an A's house, a B's house, and a C's house respectively. Moreover, it is assumed that A and B have their respective children possess the ID tag 21*a* and the ID tag 21*b* each of which stores the video display device identifier IDa and the video display device identifier IDb. In this case, it is assumed that an A's child (the object 2*a*) and a B's child (the object 2*b*) are playing with a child without an ID tag (the object 2*c*) in a park where the imaging device 1 is installed. While the imaging device 1 captures the three children (the objects 2*a* to 2*c*) and distributes the encrypted video data Cn to all the video display devices 4*a* to 4*c* connected via the network 3 with the imaging device 1, the encrypted video data Cn can be decrypted and browsed only with the video display devices 4*a* and 4*b* in the A's and B's houses, and cannot be browsed with the video display device 4*c* in the C's house.

As described above, although the viewer of the monitored video, when the viewer's child is playing, can view video that captured how things were, the viewer, when only other's child possessing the ID tag is playing, cannot view how things were. For this reason, the privacy can be adequately protected.

It should be noted that although, in the present embodiment, it is assumed that the captured video is encrypted and then distributed via the network to the video display device, video obtained by capturing may be accumulated in inside of the imaging device, of the video display device, or in an external storage medium and then reproduced for browse.

Furthermore, although, in the case where capturing took place without any object possessing the ID tag, the video obtained by capturing is not encrypted but distributed to the video display device, a key exclusively for such situation is separately set, and encryption may be performed using the key.

In addition, although only one device key is set for every video display device, plural device keys may be set for one video display device.

Moreover, regardless of objects captured, when a video display device that allows browsing of all the captured video is set and the video is encrypted, encrypted content key which is encrypted with a device key (master key) set for the video display device may be always included. For example, making the video display device in a house of a union president of an apartment management union store such master key enables the union president to browse all the captured video.

Furthermore, stored in a removable storage medium such as a memory card, and when the video is browsed with the video display device, the device key may be made available for use by attaching the removable storage medium.

In addition, the device key may be sent via the network to other video display device. This way, for example, when a parent in the A's house goes out for shopping, the device key of the A's video display device is sent to the B's video display device, and B can substitute for A to monitor video of the A's child.

Second Embodiment

Next, the following describes a second embodiment of the present invention with reference to drawings.

(Summary of Monitoring Camera System) FIG. 8 shows a summary of a monitoring camera system. The monitoring camera system according to the second embodiment of the present invention basically has the same configuration as the monitoring camera system according to the first embodiment, the imaging device 1 being changed to the imaging device 6 and the video display devices 4a, 4b, and 4c being changed into the video display devices 7a, 7b, and 7c respectively in the monitoring camera system according to the first embodiment described with reference to FIG. 1. Since the detail has already been described, it is not repeated here.

Hereinafter, a procedure in which the imaging device 6 captures the objects 2a, 2b, and 2c and distributes captured video via the network 3 to the video display devices 7a, 7b, and 7c is described in detail.

(Setup of Monitoring Camera System) The video display devices 7a, 7b, and 7c are provided with the video display device identifiers IDa, IDb, and IDc respectively. Furthermore, when the monitoring camera system is launched, the video display devices 7a, 7b, and 7c are provided with the device keys Ka, Kb, and Kc that are respectively different from each other.

The imaging device 6 stores a list in which the video display device identifiers and the device keys are associated so as to manage the device keys provided to the video display devices. Moreover, ID tags in which each video display device identifier is stored are distributed to managers of each video display device. This ID tag may be given to and possessed by a person whom a manger of a video display device wants to monitor with the video display device managed by the manager. In addition, the manager of the video display device registers, with the imaging device 6, a face image of the person to be possessed with the given ID tag. The imaging device 6 stores a list in which video display device identifiers and corresponding device keys are paired and a list in which the video display device identifiers and corresponding face images are paired.

A process procedure in which, after the above system setup, the imaging device captures the objects 2a, 2b, and 2c and distributes video obtained by capturing to the video display device, and then the video display device allows browse of the distributed monitored video is described.

Figure 9:
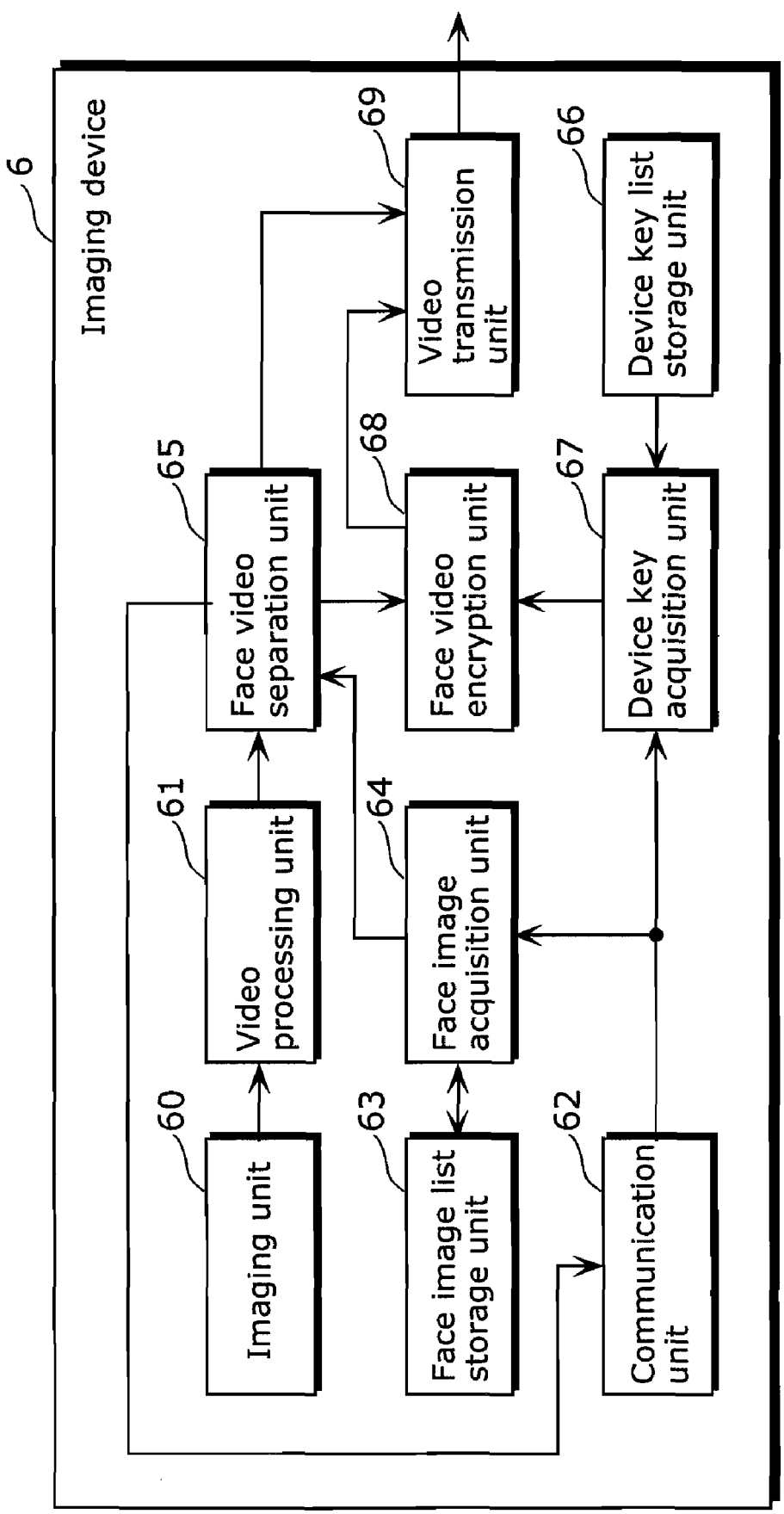
FIG. 9 is a block diagram showing a configuration of an imaging device according to a second embodiment of the present invention.

(Configuration and Operation of Imaging Device 6) FIG. 9 is a block diagram showing a configuration example of the imaging device 6. The imaging device 6 is a device which captures an object and distributes video obtained by capturing to a video display device, and includes an imaging unit 60, a video processing unit 61, a communication unit 62, an encryption key list storage unit 63, an encryption key acquisition unit 64, a face video separation unit 65, a device key list storage unit 66, a device key acquisition unit 67, a face video encryption unit 68, and a video transmission unit 69.

Composed of a lens and a pickup device, the imaging unit 60 is a process unit which converts light received via the lens from the object into electric charge and eventually outputs it as a digital video signal.

The video processing unit 61 is a process unit which performs image processing on the digital video signal outputted from the imaging unit 60 and outputs it as digital video data.

The communication unit 62 is a process unit which receives a video display device identifier from an ID tag while the object is being captured.

The face image list storage unit 63 is a storage unit which stores a list in which each video display device identifier and corresponding face image data are paired.

The face image acquisition unit 64 is a process unit which acquires, from the face image list storage unit 63, the face image data corresponding to the video display device identifier.

The face video separation unit 65 is a process unit which extracts, as face video, a partial image matching with the face image data, among the digital video data outputted from the video processing unit 61, acquired by the face image acquisition unit 64.

The encryption key list storage unit 66 is a storage unit which stores, as a list, device keys and video display device identifiers held by each video display device.

The device key acquisition unit 67 is a process unit which acquires, from the device key list storage unit 66, the device key corresponding to the video display device identifier.

The face video encryption unit 68 is a process unit which encrypts the face video extracted by the face video separation unit 65 using the device key. The video transmission unit 69 is a process unit which distributes monitored video including the encrypted face video to the video display devices 7a to 7c.

Figure 10:
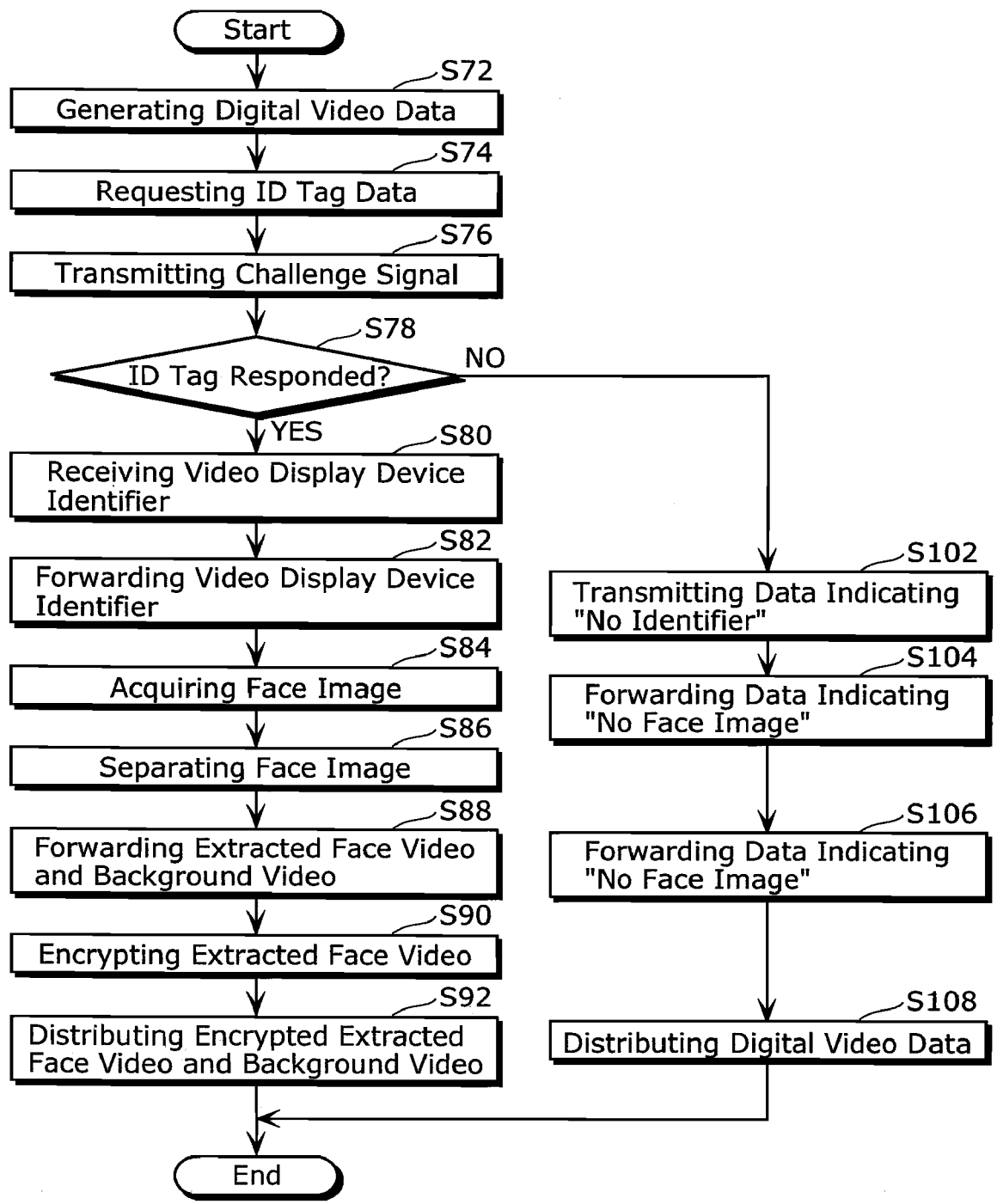
FIG. 10 is a flow chart of a process performed by an imaging device.

Hereinafter, a process in which the imaging device 6 captures the object and then distributes the monitored video to the video display devices 4a to 4c is described. FIG. 10 is a flow chart of a process performed by the imaging device 6.

The imaging unit 60 receives the light via the lens from the objects 2a, 2b, and 2c, converts it into the electric charge, and generates the digital video signal through processes such as sampling and automatic gain adjustment. After that, the digital video signal is forwarded to the video processing unit 61.

The video processing unit 61 performs the image processing on the digital video signal and generates the digital video data (S72). After that, the video processing unit 61 forwards the digital video data to the face video separation unit 65. At this time, the video processing unit 61 divides the digital video data into each predetermined number of frames. Here, the digital video data divided into each predetermined number of the frames is called digital video data M1, M2, M3, . . . along a time series. The video processing unit 61 forwards the digital video data, in order of the digital video data M1, M2, and M3, to the face video separation unit 65.

When the face video separation unit 65 receives digital video data Mn (n=1, 2, 3, . . . ), the communication unit 62, having an ID tag reader function, transmits a challenge signal of the ID tag (S76). The communication unit 62 receives tag data from the ID tag which has responded to the challenge signal (YES in S78, and S80). Here, the "tag data" is data held within by the ID tag, that is, the video display device identifier. In the case where plural ID tags responded to the challenge signal (YES in S78), the communication unit 62 receives the tag data (video display device identifiers) from all the ID tags responded (S80).

The communication unit 62 forwards, to the face image acquisition unit 64 and the device key acquisition unit 67, all the video display device identifiers received from the ID tags. It should be noted that in the case where there is no ID tag responding to the challenge signal transmitted by the communication unit 62 (NO in S78), the communication unit 62 transmits data indicating "no identifier" as the video display device identifier to the face image acquisition unit 64 and the device key acquisition unit 67 (S102). According to an example shown by FIG. 8, the communication unit 62 receives, from the ID tags 21a and 21b possessed respectively by the objects 2a and 2b, the video display device identifiers IDa and IDb.

The face image acquisition unit 64 forwards, to the face image list storage unit 63, the video display device identifier received from the communication unit 62. The face image storage unit 63 forwards, to the face image acquisition unit 64, a face image corresponding to the video display device identifier received from the face image acquisition unit 64. Having received plural video display device identifiers, the face image storage unit 63 forwards, to the face image acquisition unit 64, all the face images corresponding to those. After that, the face image acquisition unit 64 forwards all the received face images to the face video separation unit 65 (S84). It should be noted that having received, from the communication unit 62, data indicating "no identifier" instead of the video display device identifier, the face image acquisition unit 64 forwards, to the face video separation unit 65, data indicating "no face image" instead of the face image (S104).

According to the example shown by FIG. 8, the face image acquisition unit 64 receives the video display device identifiers IDa and IDb from the communication unit 62. The face image acquisition unit 64 forwards the received video display device identifiers IDa and IDb to the face image list storage unit 63. The face image storage unit 63 forwards, to the face image acquisition unit 64, the face image corresponding to the video display device identifier IDa and the face image corresponding to the video display device identifier IDb. After that, the face image acquisition unit 64 forwards those received face images to the face video separation unit 65.

First, the face video separation unit 65 divides, frame by frame, the digital video data Mn received from the video processing unit 61. Next, the face video separation unit 65 performs, on each frame image, a pattern matching in which the face image received from the face image acquisition unit 64 is used as a pattern image, and separates, when there is a corresponding part to the pattern image in the frame image, the part as an extracted face image (S86). Having received plural face images from the face image acquisition unit 64, the face video separation unit 65 performs the above-mentioned pattern matching on each face image. In this way, having received k number of the face image from the face image acquisition unit 64, the face video separation unit 65 separates, from the frame image, a first extracted face image, a second extracted face image, ... the $k^{th}$ extracted face image and a background image in which the k number of the extracted face image is removed from the frame image.

The face video separation unit 65 performs the above-mentioned face image extracting process on all the frame images, and every background image and the first, the second, ... the $k^{th}$ extracted face image that is respectively assembled is regarded a background video, a first extracted face video, a second extracted face video, ... $k^{th}$ extracted face video. After that, the face video separation unit 65 adds, to the first to the $k^{th}$ extracted face video, the video display device identifier corresponding to the face image being used for the pattern matching, and forwards them to the face video encryption unit 68. Furthermore, the face video separation unit 65 forwards the background video to the video transmission unit 69 (S88).

It should be noted that having received the data indicating "no face image" from the face image acquisition unit 64, the face video separation unit 65 forwards, to the face video encryption unit 68, the data indicating "no face video." (S106) In addition, the face video separation unit 65 forwards the digital video data Mn to the video transmission unit 69.

Figure 11:
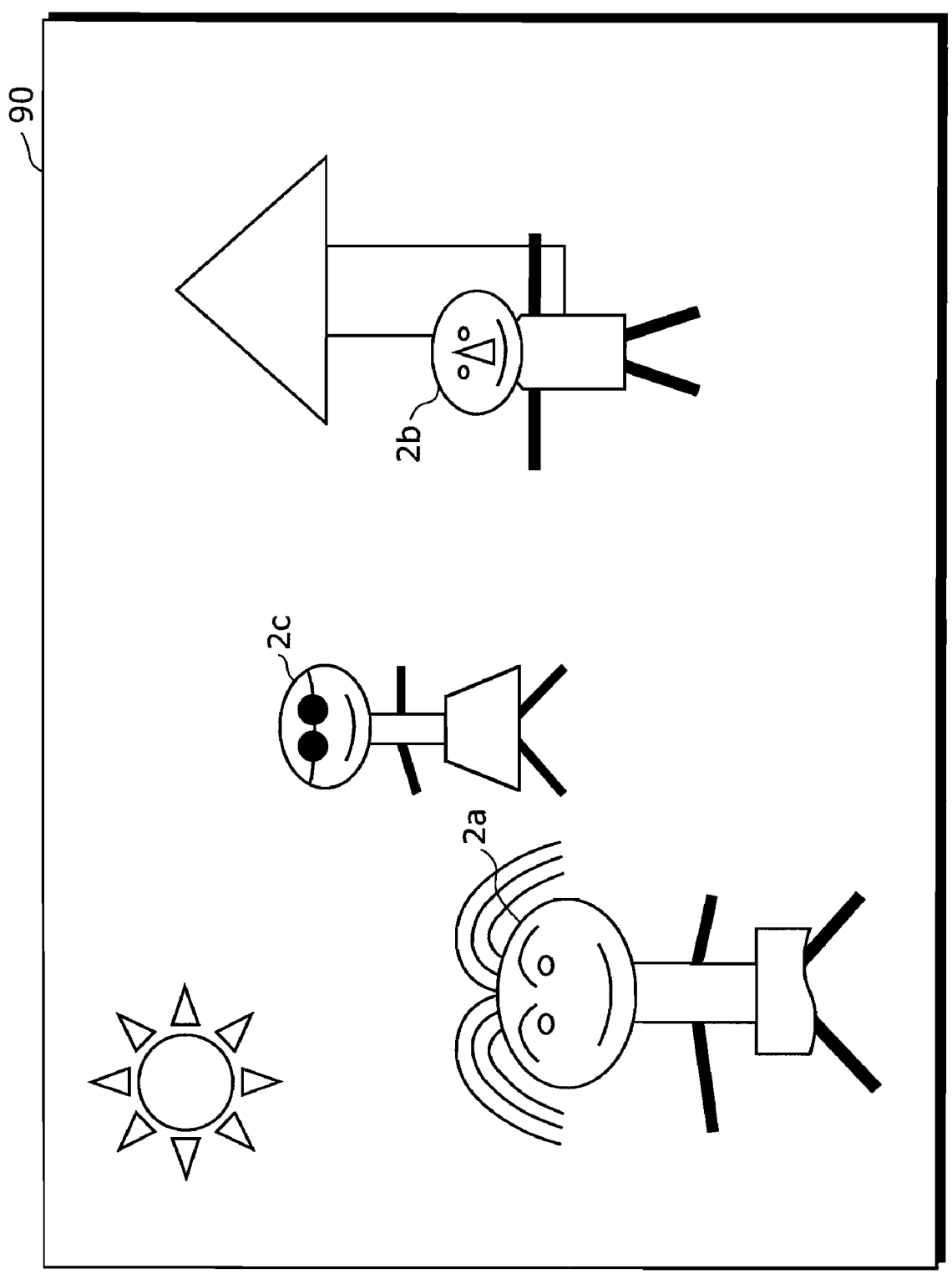
FIG. 11 is a block diagram showing a configuration of a frame image according to a second embodiment of the present invention.
Figure 12:
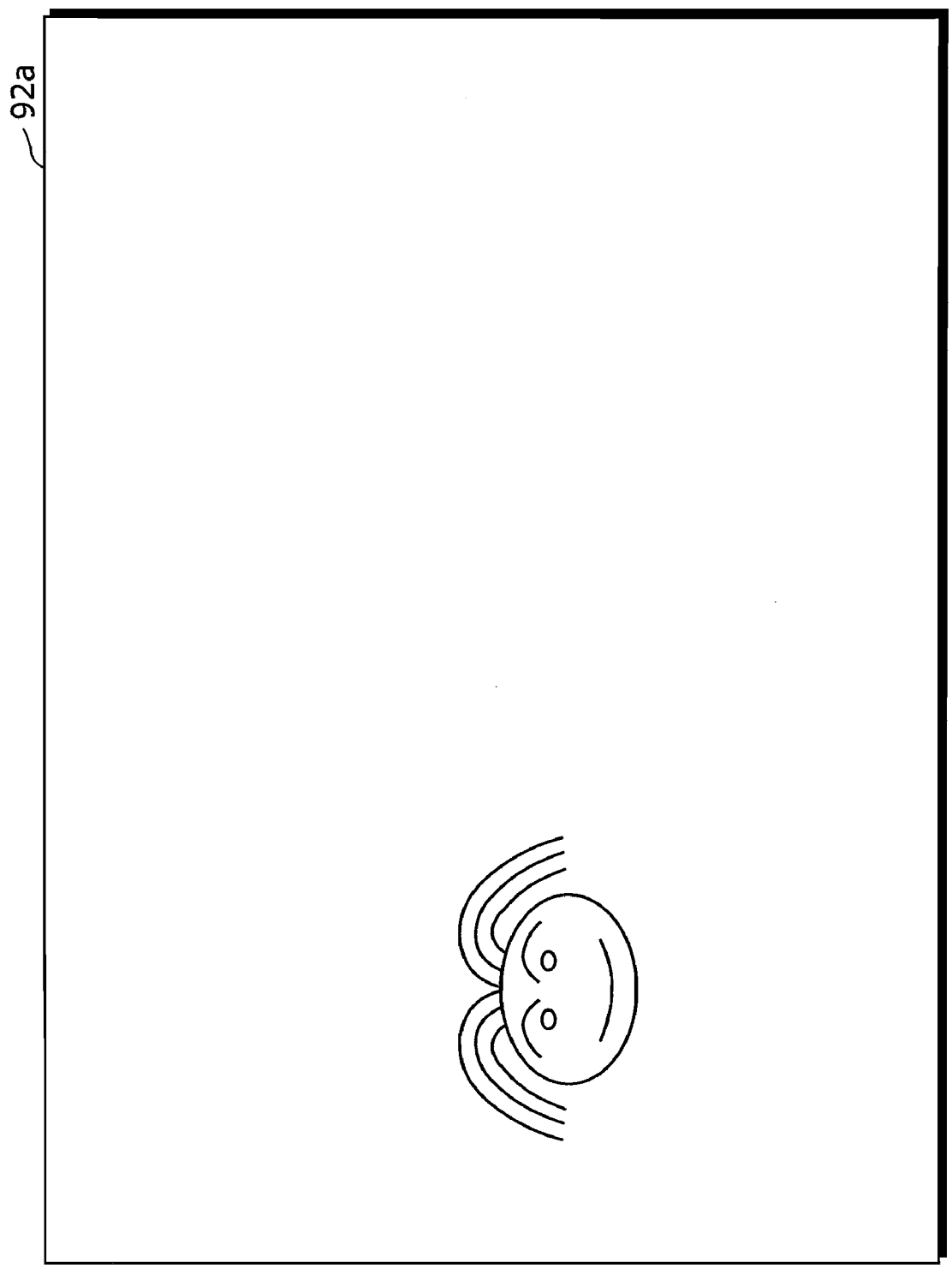
FIG. 12 is a block diagram showing a configuration of a first extracted face image according to a second embodiment of the present invention.
Figure 13:
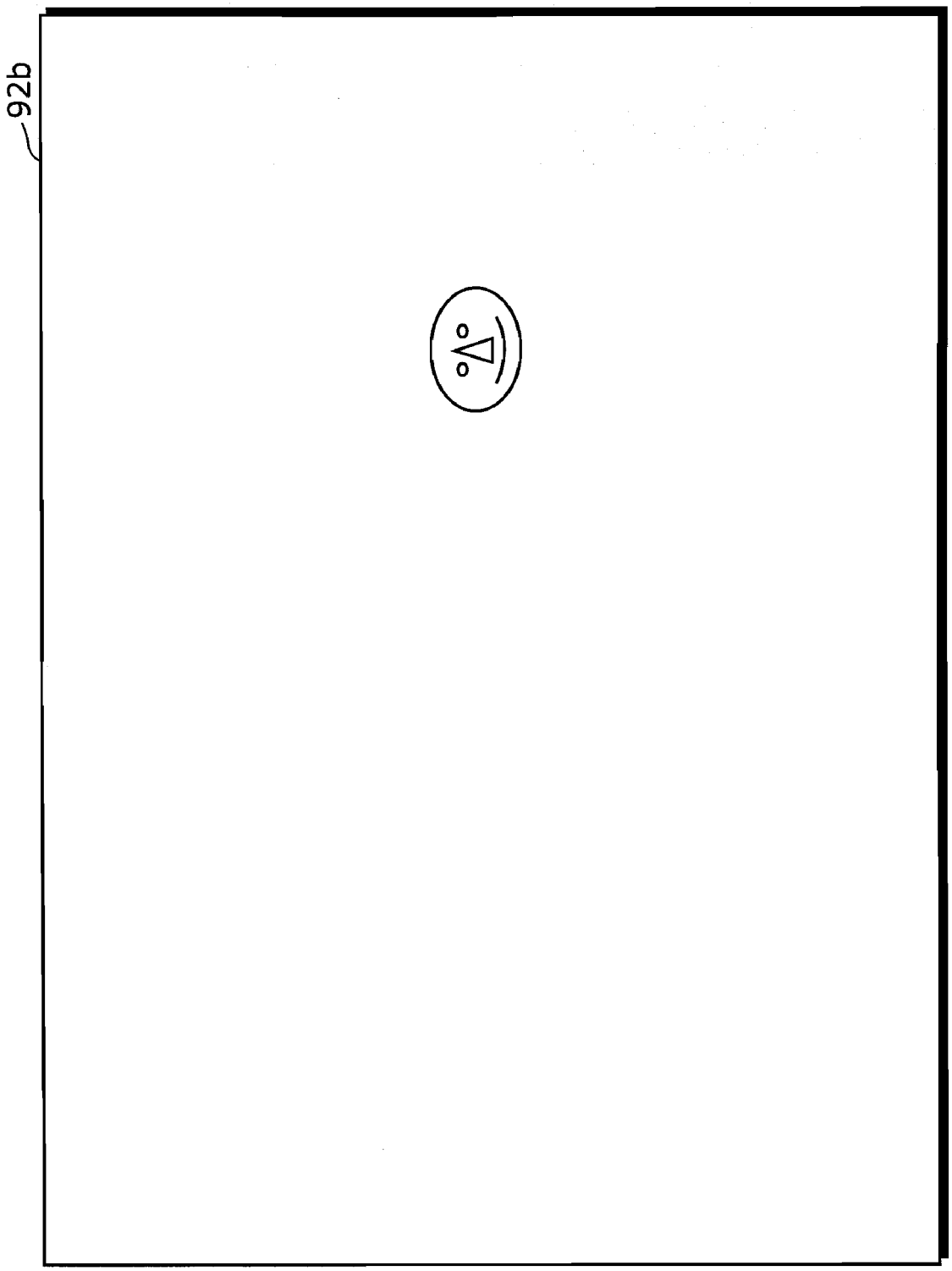
FIG. 13 is a block diagram showing a configuration of a second extracted face image according to a second embodiment of the present invention.

Among the above-mentioned series of processes, a process for separating the extracted face image from the frame image is described based on the example shown by FIG. 8. According to the example shown by FIG. 8, a case in which a frame image 90 as shown by FIG. 11 is processed by the face video separation unit 65. In the frame image 90, the objects 2a, 2b, and 2c are captured. In this case, the extracted face image extracted using the face image corresponding to the video display device identifier IDa is turned into a first extracted face image 92a as shown by FIG. 12, and the extracted face image extracted using the face image corresponding to the video display device identifier IDb is turned into a second extracted face image 92b as shown by FIG. 13. Additionally, the background video is turned into a background image 91. Adding the video display device identifier IDa to the first extracted face image 92a and the video display device identifier IDb to the second extracted face image 92b, the face video separation unit 65 forwards, to the face video encryption unit 68, the first extracted face image 92a and the second extracted face image 92b. Moreover, the face video separation unit 65 forwards the background image 91 to the video transmission unit 69.

The face video encryption unit 68 takes out the video display device identifier which is added to the extracted face video received from the face video separation 65, and forwards it to the device key acquisition 67. The device key acquisition unit 67 acquires, from the device key list storage unit 66, the device key corresponding to the received video display device identifier, and forwards it to the face video encryption unit 68. The face video encryption unit 68 encrypts the extracted face video using the received device key and generates encrypted extracted face video (S90). Additionally, the face video encryption unit 68 adds the video display device identifier to the encrypted extracted face video and forwards it to the video transmission unit 69. It should be noted that having received plural extracted face video (the first, the second, ... the $k^{th}$ extracted face video) from the face video separation unit 65, the face video encryption unit 68 performs the above-mentioned encryption process on each extracted face video and generates the encrypted first, second, ... $k^{th}$ extracted face video. Furthermore, the face video encryption unit 68 adds the video display device identifier to the encrypted first, second, ... $k^{th}$ extracted face video respectively and forwards them to the video transmission unit 69. In addition, having received the data indicating "no face video" instead of the extracted face video from the face video separation unit 65, the face video encryption unit 68 performs no process.

According to the example shown by FIG. 8, the face video encryption unit 68 encrypts the first extracted face image 92a shown by FIG. 12 using the device key Ka. Moreover, the face video encryption unit 68 encrypts the second extracted face image 92b shown by FIG. 13 using the device key Kb.

The video transmission unit 69 assembles the background video received from the face video separation unit 65 and the encrypted extracted face video received from the face video encryption unit 68, and distributes them via the network 3 to the video display devices 7a, 7b, and 7c (S90). It should be noted that having received the digital video data Mn from the face video separation unit 65, the video transmission unit 69 distributes the digital video data Mn via the network 3 to the video display devices 7a, 7b, and 7c (S108).

Figure 15:
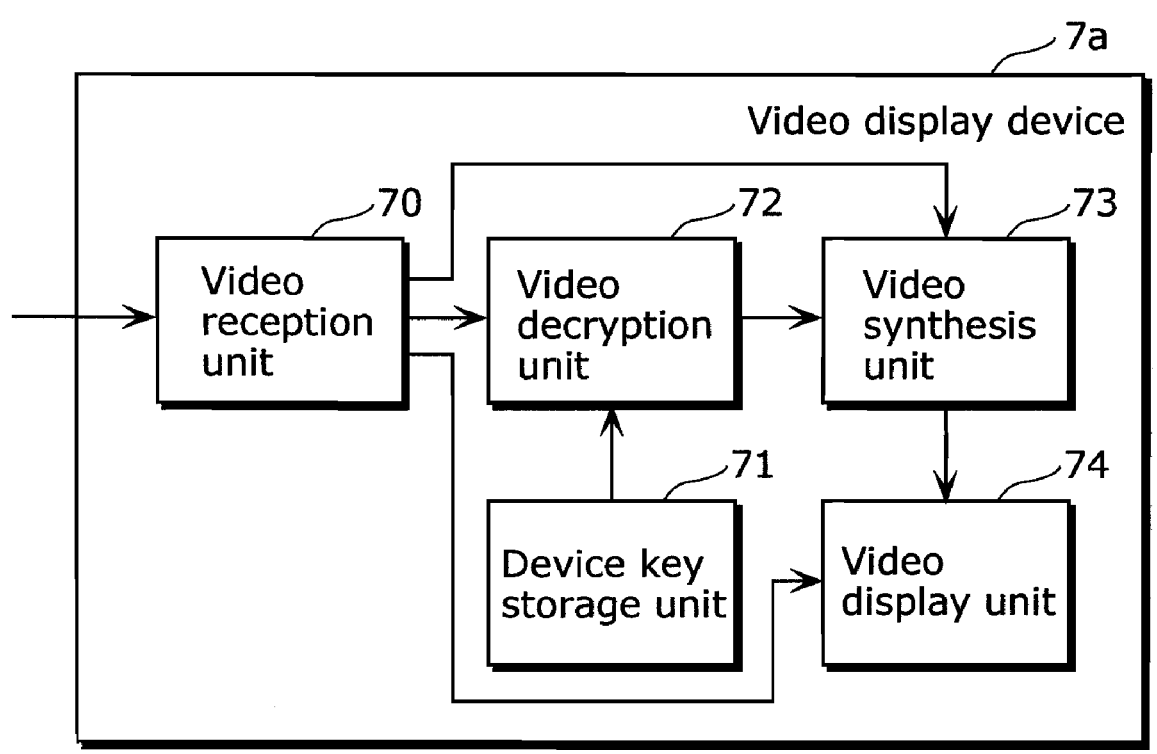
FIG. 15 is a block diagram showing a configuration of a video display device according to a second embodiment of the present invention.

(Configuration and Operation of Video Display Device 7a)
Next, a configuration and an operation of the video display devices 7a, 7b, and 7c which receive, from the imaging device 6, the background video and the encrypted extracted face video or the digital video data Mn are described with reference to FIG. 15. As the internal configuration of the video display devices 7a, 7b, and 7c is the same, the video display device 7a is described here.

The video display device 7a is a device which displays the video distributed by the imaging device 6, and includes a video reception unit 70, a device key storage unit 71, a face video decryption unit 72, a video synthesis unit 73, and a video display unit 74.

The video reception unit 70 is a process unit which receives, from the imaging device 6, background video and encrypted extracted face video or digital video data Mn.

The device key storage unit 71 is a storage unit which stores a device key of the video display device 7a.

The video decryption unit 72 is a process unit which generates digital video data by decrypting the encrypted video data Cn received by the video reception unit 70.

The video synthesis unit 73 is a process unit which synthesizes the extracted face video generated by the face video decryption unit 72 and the background video received by the video reception unit 70, and generates the digital video data.

The video display unit 74 is a process unit which displays the digital video data generated by the video synthesis unit 73 or the digital video data Mn received by the video reception unit 70.

Figure 16:
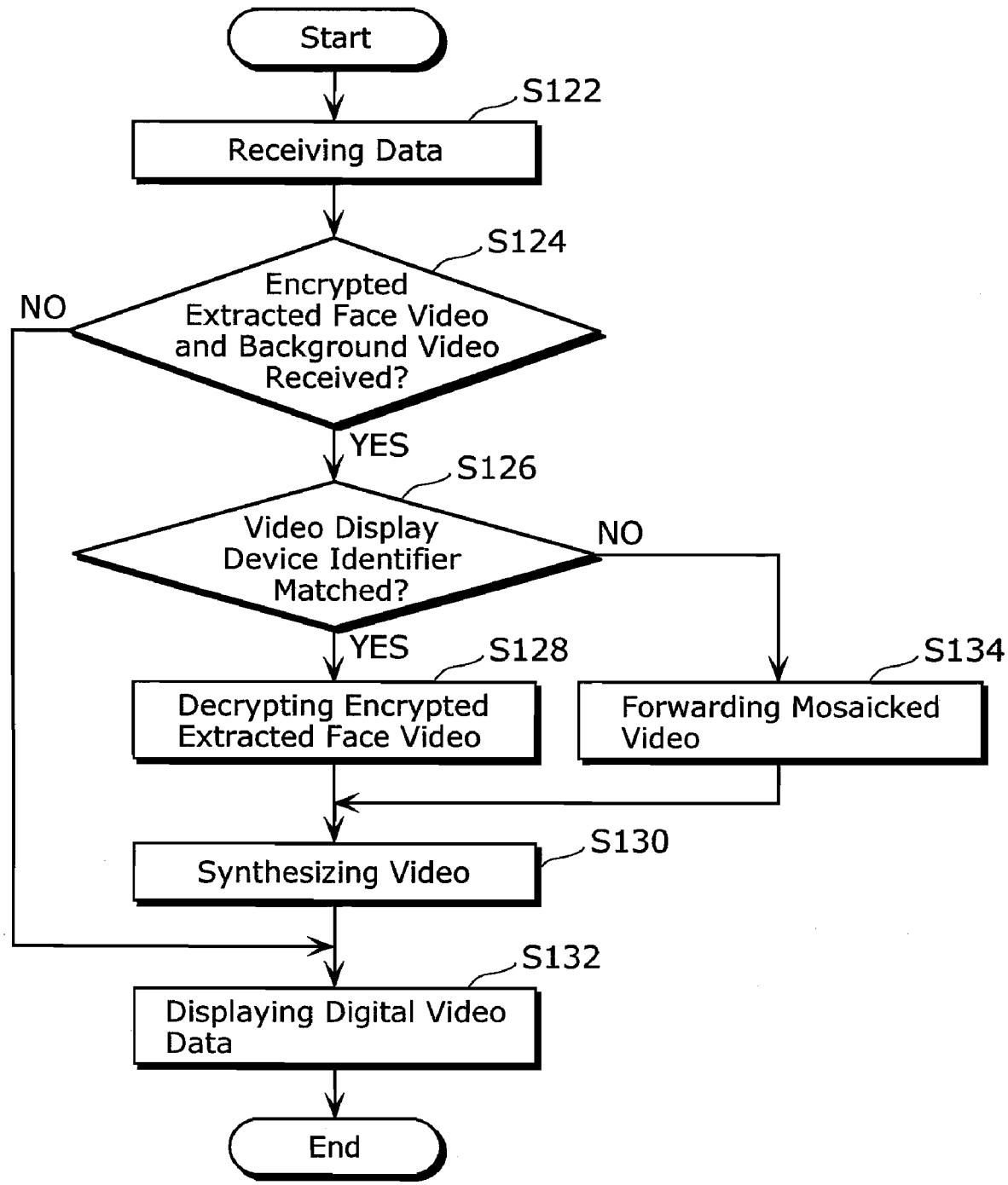
FIG. 16 is a flow chart of a process performed by a video display device.

Hereinafter, a process performed by the video display device 7a is described. FIG. 16 is a flow chart of a process performed by the video display device 7a.

The video reception unit 40 sequentially receives the background video and the encrypted extracted face image video, which are sent, or the digital video data Mn (S122). The video reception unit 70 forwards the background video to the video synthesis unit 73 and the encrypted extracted face video to the face video decryption unit 72. Moreover, the video reception unit 70 forwards the digital video data Mn to the video display unit 74.

In the case where the video reception unit 70 receives the digital video data Mn and forwards it to the video display unit 74 (NO in S124), the video display unit 74 displays the digital video data Mn in such a way that a viewer of the monitored video can browse (S132).

In the case where the video reception unit 70 receives the background video and the encrypted extracted face video (YES in S124), the face video decryption unit 72, holding its own video display device identifier within, determines whether or not the held video display device identifier corresponds to a video display device identifier included in the encrypted extracted face video data (S126). When nothing corresponds (NO in S126), the face video decryption unit 72 forwards predetermined mosaicked video to the video synthesis unit 73 without decrypting the encrypted extracted face video received from the video reception unit 70.

When something corresponds (YES in S126), the face video decryption unit 72 decrypts the encrypted extracted face video using the device key acquired from the device key storage unit 71, and seeks the extracted face video (S128). It should be noted that having received plural encrypted extracted face video data from the video reception unit 70, the face video decryption unit 72 performs the above-mentioned decryption processing on each encrypted extracted face video data, seeks the mosaicked video or the extracted face video data, and forwards it to the video synthesis unit 73.

The video synthesis unit 73 synthesizes the background image received from the video reception unit 70 and the mosaicked video or the extracted face video received from the face video decryption unit 72, and generates the digital video data (S130). After that, the video synthesis unit 73 forwards the generated digital video data to the video display unit 74.

The video display unit 74 displays the digital video data received from the video synthesis unit 73 in such a way that a viewer of the monitored video can browse (S132).

Here, the above-mentioned series of processes is described with reference to FIG. 11 through FIG. 18.

Figure 14:
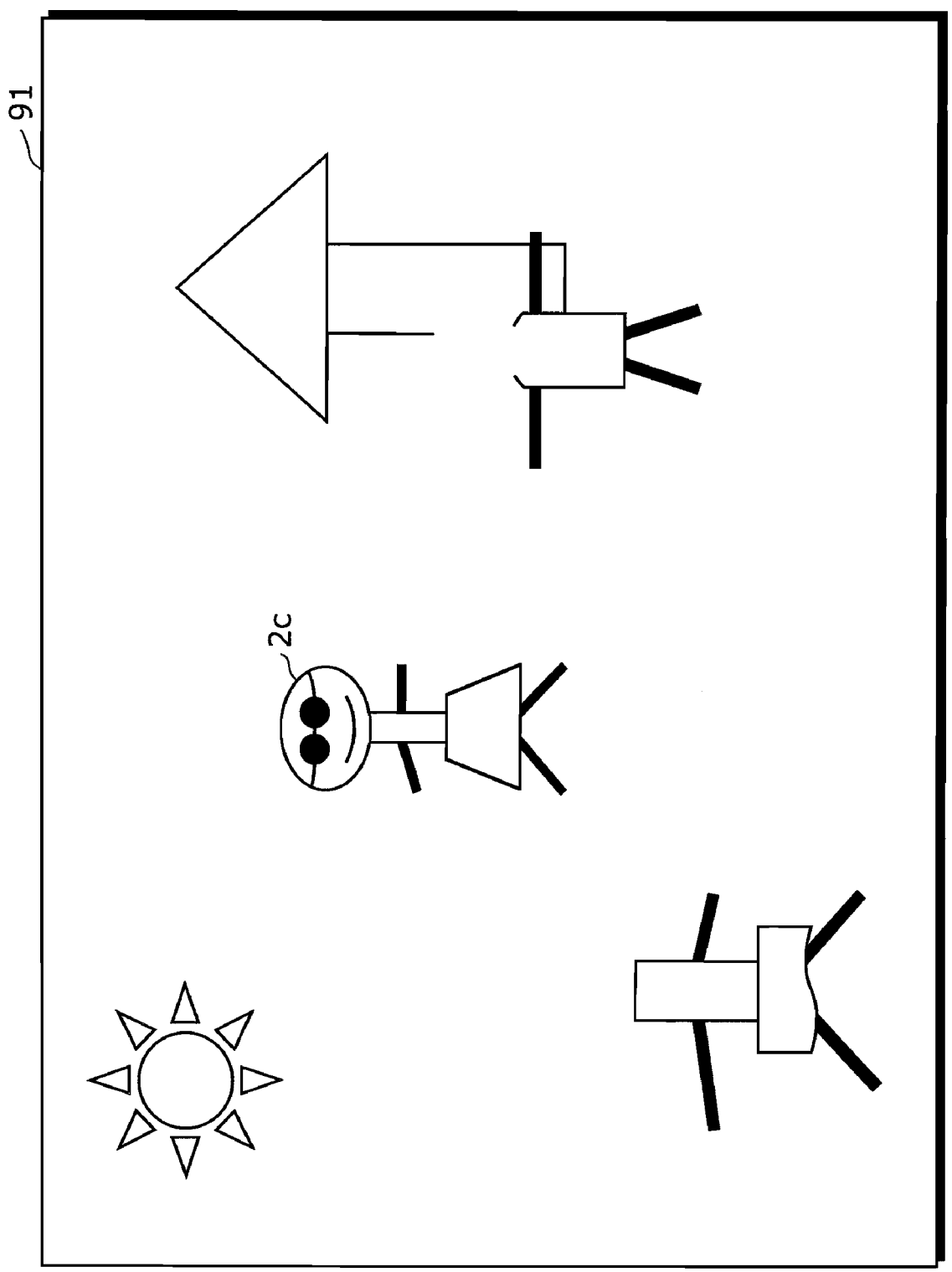
FIG. 14 is a block diagram showing a configuration of a background image according to a second embodiment of the present invention.

It is assumed that the video reception unit 70 receives, from the imaging device 6, the following: the background 91 shown by FIG. 14; the encrypted first extracted face image which is the first extracted face image 92 encrypted with the device key Ka, as shown by FIG. 12; and the encrypted second extracted face image which is the second extracted face image 92b encrypted with the device key Kb, as shown by FIG. 13 (S122 in FIG. 16).

In this case, the video reception unit 70 forwards the background image 91 to the video synthesis unit 73, and the encrypted first extracted face image and the encrypted second extracted face image to the face video decryption unit 72.

The face video decryption unit 72 holds the video display device identifier IDa. Furthermore, the video display device identifier IDa is added to the encrypted first extracted face image. For this reason, the face video decryption unit 72 decrypts the encrypted first extracted face video using the device key Ka acquired from the device key storage unit 71, and generates the first extracted face image 92a (Yes in S126, S128). The video reception unit 72 forwards the generated first extracted face image 92a to the video synthesis unit 73.

Figure 17:
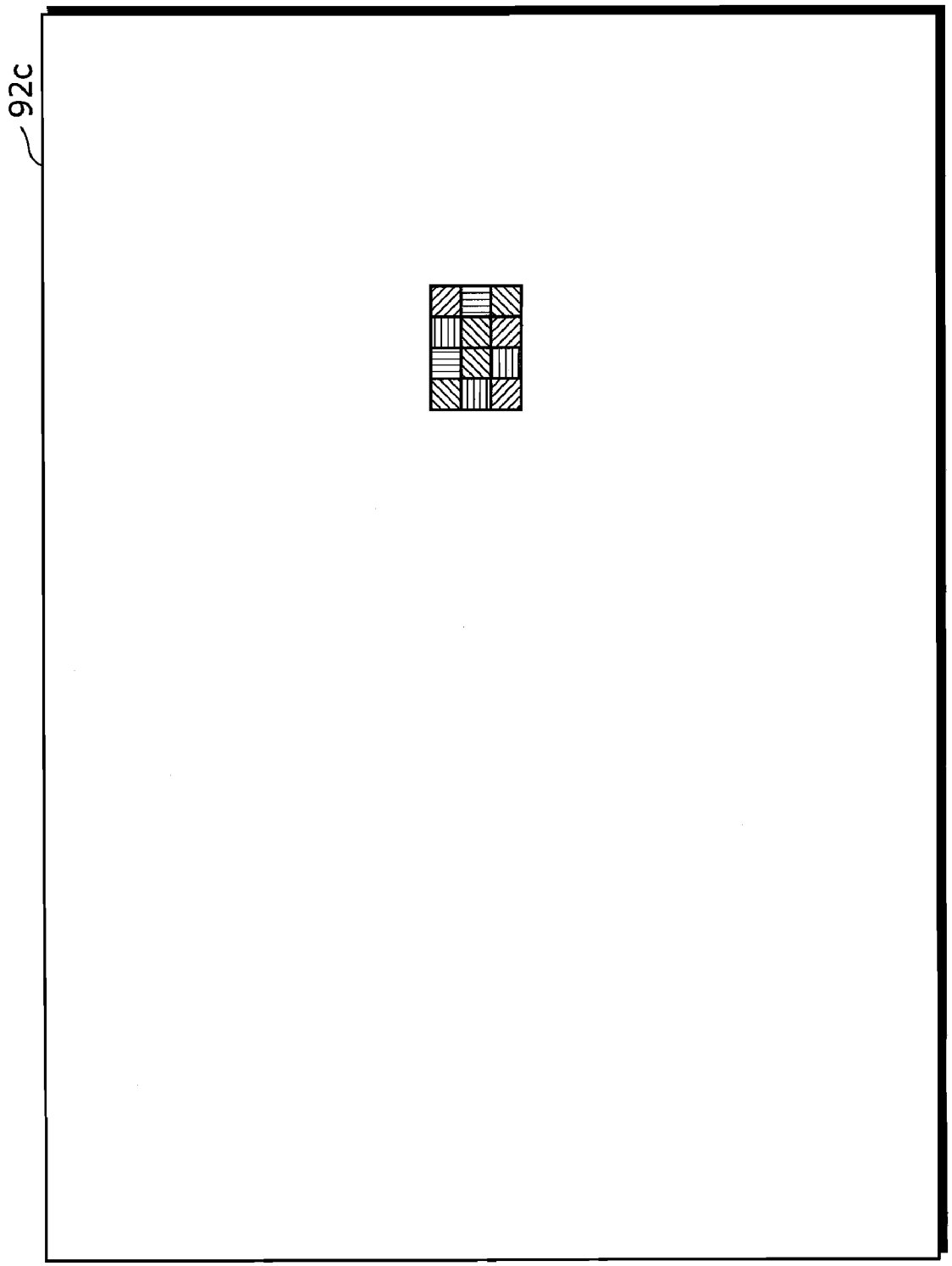
FIG. 17 is a view showing an example of a mosaicked image.

On the other hand, being added to the encrypted second extracted face image, the video display device identifier IDb does not correspond to the video display device identifier IDa held by the face video decryption unit 72. For this reason, the face video decryption unit 72 does not decrypt the encrypted second extracted face image, instead forwards the predetermined mosaicked image to the video synthesis unit 73 (S134). It should be noted that the mosaicked image is assumed to be sent with the encrypted second extracted face image from the imaging device 6. Here, data in which the mosaic processing is performed on a part of the face image of the second extracted face image 92b as shown by FIG. 13 is assumed. For example, it is the mosaicked image 92c as shown by FIG. 17.

Figure 18:
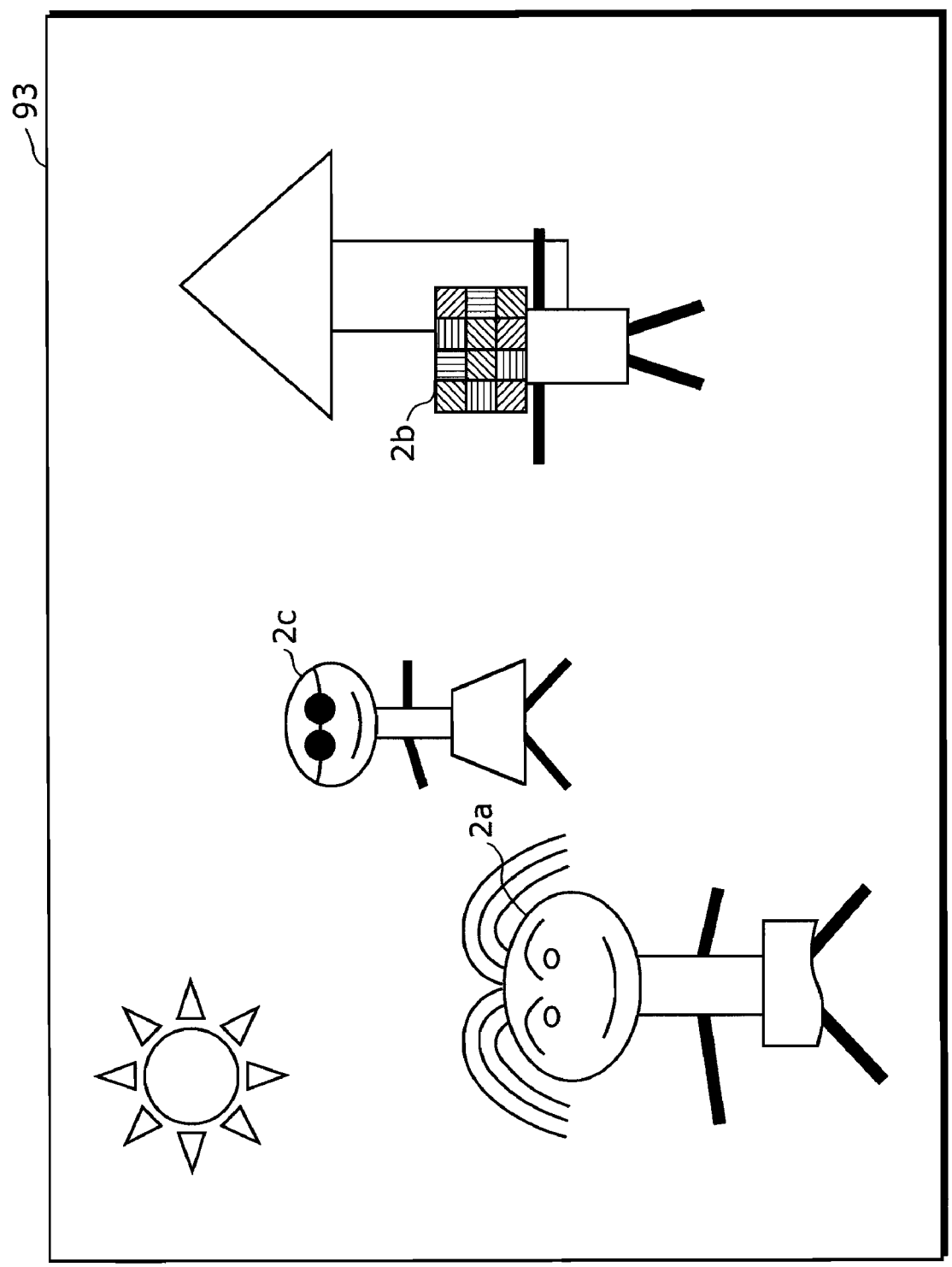
FIG. 18 is a view showing an example of digital image data displayed with a video display device.

The video synthesis unit 73 synthesizes the background image 91 received from the video reception unit 70, the first extracted face image 92a, and the mosaicked image 92c, and generates the digital image data 93 as shown by FIG. 18 (S130). Here, image synthesizing is assumed as a process for simply superimposing three images.

The digital image data 93 obtained in such a manner is turned into an image in which the mosaic processing is performed only on a facial part of the object 2b in the frame image 90 as shown by FIG. 11. This means that although a viewer of the video display device 7a can browse a face image of an object possessing an ID tag in which the video display device identifier IDa held by the video display device 7a is stored as the tag data, since mosaic is on a face image of an object possessing an ID tag in which any other video display device identifier is the tag data, the viewer cannot recognize who the object is.

That is to say, in the case where plural objects possessing the ID tag are captured in video, according to the present embodiment, each video display device, when any objects possess an ID tag with a video display device identifier different from the one held within, puts the mosaic on the face image. On the other hand, according to the first embodiment, in the above-mentioned situation, when any ID tags possessed by the objects correspond to the video display device identifier held within the video display device, video without the mosaic can be viewed. For this reason, the second embodiment allows a more detailed privacy protection setting than the first embodiment.

In should be noted that although, in the present embodiment, the video display device is designed to replace the encrypted extracted image data having an identifier not corresponding to its own video display device identifier with the mosaicked image, this may not be the mere mosaicked image but an image which indicates a video display device identifier of an object in the mosaicked image. For example, a mosaicked image that is separated by color in accordance with video display device identifiers may be considered. This way, even if a face of an object is mosaicked, it is possible to recognize whose house the object belongs to. In addition, an image which is pre-designated by a user of the monitoring camera system may be used for replacement. For example, the object $2b$ is arranged to be replaced with "a face image of a dog," and such information is shared among parents close to each other. Even when the object $2b$ is replaced with the face image of the dog, the parents close to each other can know who the object $2b$ is. In addition, instead of displaying the mosaicked image, no image may be displayed for that part.

Moreover, in the present embodiment, the face video separation unit 65 generates the background image by removing the extracted face image from the frame image and the background video by assembling the background images over all the frames. However, a method for generating the background image or the background video is not limited by the above method. For example, the background image or the background video may be generated not only by capturing video in a situation where there is no object but also by synthesizing plural images in which the extracted face image was removed from the frame image (for example, performing addition average on each pixel value). The background image or the background video, for example, is stored in the face video separation 65 beforehand, and may be used when the face video separation unit 65 forwards the background video to the video transmission unit 69.

Furthermore, in the first and second embodiments, the imaging device performs a process for identifying a specific object included in captured video and for encrypting the identified specific object. Instead of this configuration, a distribution device being provided in addition to the imaging device, a configuration in which the imaging device transmits the captured video as-is to the distribution device and the distribution device identifies the specific object, encrypts the video data, and distributes it to the video display device may be possible. Having such configuration allows to configure the same configuration as the first and second embodiments just by further providing the existing imaging device with the distribution device.

In addition, in the first and second embodiments, it is designed that a specific video display device can display the captured video which is encrypted using a device key held within the specific video display device, but a configuration is not limited by this configuration. What is described above, for example, may be realized by distributing the captured video to the specific video display device.

Moreover, although, in the first and second embodiments, it is designed that the image device distributes the encrypted monitored video to all the video display devices, the monitored video may be distributed only to a video display device corresponding to a video display device identifier identified by the communication unit. It should be noted that, in such case, the imaging device, not encrypting the monitored video, may distribute it only to the video display device.

Furthermore, although, in the first and second embodiments, the example in which a child of one's house is monitored by making the video display device $4a$ ($7a$) of the A's house display the object $2a$ that is the A's child and the video display device $4b$ ($7b$) of the B's house display the object $2b$ that is the B's child has been described, it may be designed that a child of other's house can be monitored with the monitored video of the video display device. For example, a manager of the video display device $4c$ ($7c$) may write the video display device identifier IDc other than the video display device identifier IDa on the ID tag $21a$ to be possessed by the object $2a$ so that the object $2a$ who is the A's child can be monitored by a family (the C's house) having the video display device $4c$ ($7c$). In this case, the imaging device 1 (6) would receive, from the ID tag $21a$ possessed by the object $2a$, two video display device identifiers IDa and IDc. For this reason, the monitored video in which the object $2a$ is included can be decrypted and viewed with both the video display devices $4a$ ($7a$) and $4c$ ($7c$) of the A's and C's houses. In addition, in order to realize such monitoring of the child of other's house with time limitation, along with the video display device identifier IDc, an expiration date of the video display device identifier IDc, that is, time limit information which allows the video display device $4c$ to monitor, may be added to and stored in the ID tag $21a$. In this case, holding current time information inside, the imaging device 1 (6) judges whether or not it is within a period for permitting monitoring with the video display device $4c$ ($7c$) identified by the video display device identifier IDc, based on the expiration date of the video display device identifier IDc received from the ID tag $21a$ and the current time information. As long as the imaging device 1 (6) judges that it is within the period for permitting monitoring, it encrypts the digital video data using the device key Kc in addition to the device key Ka.

Similar to what is mentioned above, other configuration example in which a child of other's house can be monitored on the monitored video of the video display device is described. The manger of the video display device $4a$ ($7a$) may be allowed to set, other than the device key Ka, the device key Kc as the device key corresponding to the video display device identifier IDa in the device key list storage unit 13 (66) of the imaging device 1 (6). In this case, since the imaging device 1 (6) receiving the video display device identifier IDa from the ID tag $21a$ possessed by the object $2a$ encrypts the digital video data using both the device keys Ka and Kc, it becomes possible to decrypt and view the monitored video in which the object $2a$ is included with both the video display devices $4a$ ($7a$) and $4c$ ($7c$) of the A's and B's houses. Moreover, in order to realize such monitoring of the child of other's house with time limitation, along with the device key Kc, an expiration date which allows the video display device $4c$ to monitor may be stored in the device key list storage unit 13 (66). In this case, the imaging device 1 (6) holds current time information inside, and when receiving the video display device identifier IDa from the ID tag $21a$, in the case where the device key Kc is set with an expiration date in the device key list storage 13 (66), the imaging device 1 (6) judges whether or not it is within a period for permitting monitoring with the video display device $4c$ ($7c$) identified by the video display device identifier IDc, based on the expiration date and the current time information. As long as the imaging device 1

(6) judges that it is within the period for permitting monitoring, it encrypts the digital video data using the device key Kc in addition to the device key Ka.

Furthermore, in the imaging device 6 according to the second embodiment, the face video separation unit 65 is designed to extract, from the digital video data to be outputted from the video processing unit 61, a partial image matching with the face image data corresponding to the video display device identifier received by the communication unit 62 as face video. However, a method of extracting the face video is not limited by the above-mentioned method and may not be a method using the video display device identifier. For example, an object included in the digital video data may be directly identified by searching the face image data pre-registered in the face image list storage unit 63 by the pattern matching among the digital video data.

In addition, although, in the first embodiment, a configuration is that the digital video data is encrypted using the content key, the content key used for encryption is encrypted by the device key, and the encrypted digital video data and the content key are distributed to the video display device, the digital video data itself may be encrypted with the device key and distributed to the video display device.

Moreover, although, in the second embodiment, a configuration is that the extracted face video is encrypted with the device key and the encrypted extracted face video is distributed to the video display device, the extracted face video may be encrypted using the content key, the content key used for encryption may be encrypted with the content key, and the encrypted extracted face video and the content key may be distributed to the video display device.

Furthermore, although, in the second embodiment, the face image data is registered with the imaging device 6 and then the partial image matching the face video data among the digital video data outputted from the video processing unit 61 is extracted as the face video, the image data to be registered with the imaging device 6 does not always need to be the face image, and as long as image data can specify the object, other image data may be good. For example, image data of a name tag possessed by an object, character image data such as name, address, telephone number, and so on, image data of a total individual, and the like can be considered.

It should be noted that been described based on the first and second embodiments, the present invention is not certainly limited by the above-mentioned embodiments. The present invention includes the following case.

(1) Each of the above-mentioned devices is specifically a computer system composed of a microprocessor, ROM, RAM, a hard disk unit, a display unit, a keyboard, a mouse, and the like. A computer program is stored in the RAM or the hard disk unit. As the microprocessor operates in accordance with the computer program, each device achieves its own function. Here, the computer program is configured by combining a plurality of instruction codes indicating an instruction for the computer so as to achieve predetermined functions.

(2) A partial or an entire component composing each of the above-mentioned devices may be composed of a system large scale integration (LSI). The system LSI is a super-multifunctional LSI manufactured by integrating plural components on a chip, and is specifically a computer system composed including the microprocessor, the ROM, the RAM, and the like. The computer program is stored in the RAM. As the microprocessor operates in accordance with the computer program, the system LSI achieves its own function.

It should be noted that although the system LSI may be called an IC, a LSI, a super LSI, and an ultra LSI based on the difference in integration degrees, needless to say, the present invention includes a case where the system LSI is realized with any above-mentioned integration degrees. In addition, a method of building an integrated circuit is not limited by the LSI and may be realized with a dedicated communication circuit or a general-purpose processor. Moreover, after manufacturing of the LSI, programmable Field Programmable Gate Array (FPGA) and a reconfigurable processor that can reconfigure connection and setting of a circuit cell inside the LSI may be used.

What is more, in the case where a technology for building the integrated circuit that replaces the LSI emerges with progress in semiconductor technology or other deriving technologies, as a matter of course, the component may be integrated using the technology. There is some possibility of adapting biotechnology and the like.

(3) A partial or an entire component composing each of the above-mentioned devices may be composed of an IC card detachable to each device or a stand alone module. The IC card or the module is a computer system composed of the microprocessor, the ROM, the RAM, and the like. The IC card or the module may include the above-mentioned ultra multifunctional LSI. As the microprocessor operates in accordance with the computer program, the IC card or the module achieves its own function. The IC card or the module may include tamper resistance.

(4) The present invention may be the methods described above. Furthermore, it may be not only a computer program which allows a computer to realize these methods, but also a digital signal comprised of the computer program.

In addition, the present invention may be that the above-mentioned computer program or the above-mentioned digital signal is recorded in a computer-readable recording medium, for example, such as a flexible disk, a hard disk, CD-ROM, MO, DVD, DVD-ROM, DVD-RAM, Blu-ray Disc (BD), and a semiconductor memory. Moreover, the present invention may be the above-mentioned digital signal recorded in these recording media.

Furthermore, the present invention may be that the above-mentioned computer program or the above-mentioned digital signal is transmitted via a network represented by a telecommunication line, a radio or cable communication line, and the internet, data broadcasting, and so on.

In addition, the present invention is the computer system including the microprocessor and the memory. The memory may record the above-mentioned computer program, and the microprocessor may operate in accordance with the above-mentioned computer program.

Moreover, recording and transferring the above-mentioned computer program or the above-mentioned digital signal in the above-mentioned recording medium or transferring the above-mentioned computer program or the above-mentioned digital signal via the above-mentioned network and the like may allow other independent computer system to perform implementation.

(5) The above-mentioned embodiments and the above-mentioned modifications may be combined.

INDUSTRIAL APPLICABILITY

According to the monitoring camera system of the present invention, it is possible to designate a video display device with which the monitored video can be viewed. Consequently, it is useful in realizing the monitoring camera system and the like which are capable of adequately protecting the privacy of the object.

The invention claimed is:

1. A monitoring camera system comprising an imaging device which captures video and distributes captured video, and a video display device which receives and displays the captured video, wherein said imaging device includes:

a capturing unit operable to capture video;

an encryption key storage unit in which encryption key data is stored for at least one individual, the encryption key data being associated with a video display device that is permitted to display captured video that includes video of the at least one individual;

an object judging unit operable to judge whether or not the captured video includes video of the at least one individual associated with the video display device;

a limited-capture video generation unit operable to (i) convert at least a part of the captured video that includes video of the at least one individual into encrypted video, by encrypting the part of the captured video that includes video of the at least one individual using the encryption key data, which is associated with the video display device and is stored for the at least one individual, (ii) generate limited-capture video, which includes the encrypted video, when said object judging unit judges that the captured video includes video of the at least one individual, and (iii) output the captured video, when said object judging unit judges that the captured video does not include video of the at least one individual; and a video distribution unit operable to distribute one of the limited-capture video and the captured video to said video display device, the limited-capture video being generated by said limited-capture video generation unit and the captured video being outputted by said limited-captured video generation unit, and said video display device includes:

a reception unit operable to receive one of the limited-capture video and the captured video;

a decryption key storage unit operable to store decryption key data which is associated with said video display device; and a video decryption unit operable to generate decrypted video by decrypting the encrypted video included in the limited-capture video using the decryption key data.

2. An imaging device which captures video and distributes captured video, comprising:

a capturing unit operable to capture video;

an encryption key storage unit in which encryption key data is stored for at least one individual, the encryption key data being associated with a video display device that is permitted to display captured video that includes video of the at least one individual;

an object judging unit operable to judge whether or not the captured video includes video of the at least one individual associated with the video display device;

a limited-capture video generation unit operable to (i) convert at least a part of the captured video that includes video of the at least one individual into encrypted video, by encrypting the part of the captured video that includes video of the at least one individual using the encryption key data, which is associated with the video display device and is stored for the at least one individual, (ii) generate limited-capture video, which includes the encrypted video, when said object judging unit judges that the captured video includes video of the at least one individual, and (iii) output the captured video, when said object judging unit judges that the captured video does not include video of the at least one individual; and a video distribution unit operable to distribute one of the limited-capture video and the captured video to the video display device, the limited-capture video being generated by said limited-capture video generation unit and the captured video being outputted by said limited-capture video generation unit.

3. The imaging device according to claim 2, further comprising a radio signal reception unit operable to receive a radio signal emitted from an identification (ID) tag attached to the at least one individual, wherein video display device designation information and the encryption key data are stored, for the at least one individual, in association with each other, in said encryption key storage unit, the video display device designation information designating the video display device that is permitted to display the captured video that includes video of the at least one individual, and said object judging unit is operable to judge whether or not the captured video includes video of the at least one individual depending on whether or not an identification code included in the radio signal received by said radio signal reception unit matches the video display device designation information stored by said encryption key storage unit.

4. The imaging device according to claim 2, wherein the encrypted key data, which is associated with the video display device and is stored for the at least one individual, and the decryption key data held by the video display device are common key data.

5. The imaging device according to claim 2, wherein said limited-capture video generation unit includes:

a key generation unit operable to generate video encryption key data;

a captured video encryption unit operable to convert at least a part of the captured video that includes video of the at least one individual into the encrypted video by encrypting the part of the captured video that includes video of the at least one individual using the video encryption key data generated by said key generation unit, when said object judging unit judges that the part of the captured video includes video of the at least one individual;

a video key encryption unit operable to convert the video encryption key data generated by said key generation unit into encrypted video encryption key data by encrypting the video encryption key data using the encryption key data, which is associated with the video display device and is stored for the at least one individual; and a generation unit operable to generate the limited-capture video that includes the encrypted video generated by said video encryption unit and the encrypted video encryption key data generated by said video encryption unit.

6. The imaging device according to claim 2, wherein the limited-capture video generation unit includes:

a conversion unit operable to convert specific object video, which is video of the at least one individual in the captured video, into encrypted specific object video by encrypting the specific object video using the encryption key data, which is associated with the video display device and is stored for the at least one individual, when said object judging unit judges that the captured video includes video of the at least one individual;

a background video generation unit operable to generate background video in which the specific object video is removed from the captured video, when said object judging unit judges that the captured video includes video of the at least one individual; and a generation unit operable to generate the limited-capture video that includes the encrypted specific object video generated by said conversion unit and the background video generated by said background video generation unit.

7. The imaging device according to claim 6, further comprising:
a background video storage unit operable to store background video captured beforehand in a situation where the captured video does not include video of the at least one individual,
wherein said background video generation unit is operable to read out the background video from said background video storage unit, when said object judging unit judges that the captured video includes video of the at least one individual.

8. The imaging device according to claim 6, further comprising:
a background video storage unit operable to store background video generated by synthesizing a plurality of videos in which the specific object video is removed from the captured video,
wherein said background video generation unit is operable to read out the background video from said background video storage unit, when said object judging unit judges that the captured video includes video of the at least one individual.

9. The imaging device according to claim 6, further comprising a face image storage unit in which face image data of the at least one individual is stored,
wherein said conversion unit includes:
an extraction unit operable to read out, from said face image storage unit, the face image data associated with the at least one individual, and to extract the specific object video by searching the read out face image data in the captured video; and
a video conversion unit operable to convert the specific object video extracted by said extraction unit into the encrypted specific object video by encrypting the specific object video using the encryption key data, which is associated with the video display device and is stored for the at least one individual.

10. A distribution device which distributes, to a video display device, captured video captured by an imaging device, said distribution device comprising:
an encryption key storage unit in which encryption key data is stored for at least one individual, the encryption key data being associated with the video display device that is permitted to display captured video that includes video of the at least one individual;
an object judging unit operable to judge whether or not the captured video includes video of the at least one individual associated with the video display device;
a limited-capture video generation unit operable to (i) convert at least a part of the captured video that includes video of the at least one individual into encrypted video, by encrypting the part of the captured video that includes video of the at least one individual using the encryption key data, which is associated with the video display device and is stored for the at least one individual, (ii) generate limited-capture video, including the encrypted video, when said object judging unit judges that the captured video includes video of the at least one individual, and (iii) output the captured video, when said object judging unit judges that the captured video does not include video of the at least one individual; and
a video distribution unit operable to distribute one of the limited-capture video and the captured video to the video display device, the limited-capture video being generated by said limited-capture video generation unit, and the captured video being outputted by said limited-capture video generated unit.

11. The distribution device according to claim 10,
wherein the limited-capture video generation unit includes:
a conversion unit operable to convert the specific object video, which is video of the at least one individual in the captured video, into encrypted specific object video by encrypting the specific object video using the encryption key data, which is associated with the video display device and is stored for the at least one individual, when said object judging unit judges that the captured video includes video of the at least one individual;
a background video generation unit operable to generate background video in which the specific object video is removed from the captured video, when said object judging unit judges that the captured video includes video of the at least one individual; and
a generation unit operable to generate the limited-capture video that includes the encrypted specific object video generated by said conversion unit and the background video generated by said background video generation unit.

12. The distribution device according to claim 11, further comprising:
a background video storage unit operable to store background video captured beforehand in a situation where the captured video does not include video of the at least one individual,
wherein said background video generation unit is operable to read out the background video from said background video storage unit, when said object judging unit judges that the captured video includes video of the at least one individual.

13. The distribution device according to claim 11, further comprising:
a background video storage unit operable to store background video generated by synthesizing a plurality of videos in which the specific object video is removed from the captured video,
wherein said background video generation unit is operable to read out the background video from the background video storage unit, when said object judging unit judges that the captured video includes video of the at least one individual.

14. A distribution method for use in a distribution device which distributes, to a video display device, captured video captured by an imaging device,
wherein encryption key data is stored for at least one individual in the distribution device, the encryption key data being associated with the video display device that is permitted to display captured video that includes video of the at least one individual,
said method comprising:
an object judging step of judging whether or not the captured video includes video of the at least one individual associated with the video display device;
a limited-capture video generating step of (i) converting at least a part of the captured video that includes video of the at least one individual into encrypted video by encrypting the part that includes video of the at least one individual using the encryption key data, which is associated with the video display device and is stored for the at least one individual, (ii) generating limited-capture video, including the encrypted video, when it is judged in said object judging step that the captured video includes video of the at least one individual, and (iii) outputting the captured video, when it is judged in said object judging step that the captured video does not include video of the at least one individual; and a video distributing step of distributing one of the limited-capture video and the captured video to the video display device, the limited-capture video being generated in said limited-capture video generated step, and the captured video being outputted in said limited-capture video generating step.

15. A program recorded on a non-transitory computer-readable storage medium, which is used in a distribution device which distributes, to a video display device, captured video captured by an imaging device, wherein encryption key data is stored for at least one individual in the distribution device, the encryption key data being associated with the video display device that is permitted to display captured video that includes video of the at least one individual, said program causes a computer to execute:

an object judging step of judging whether or not the captured video includes video of the at least one individual associated with the video display device;

a limited-capture video generating step of (i) converting at least a part of the captured video that includes video of the at least one individual into encrypted video by encrypting the part that includes video of the at least one individual using the encryption key data, which is associated with the video display device and is stored for the at least one individual, (ii) generating limited-capture video, including the encrypted video, when it is judged in said object judging step that the captured video includes video of the at least one individual, and (iii) outputting the captured video, when it is judged in said object judging step that the captured video does not include video of the at least one individual; and a video distributing step of distributing one of the limited-capture video and the captured video to the video display device, the limited-capture video being generated in said limited-capture video generated step, and the captured video being outputted in said limited-capture video generating step.

16. An integrated circuit for distributing, to a video display device, captured video captured by an imaging device, said integrated circuit comprising:

an encryption key storage unit in which encryption key data is stored for at least one individual, the encryption key data being associated with the video display device that is permitted to display captured video that includes video of the at least one individual;

an object judging unit operable to judge whether or not the captured video includes video of the at least one individual associated with the video display device;

a limited-capture video generation unit operable to (i) convert at least a part of the captured video that includes video of the at least one individual into encrypted video, by encrypting the part of the captured video that includes video of the at least one individual using the encryption key data, which is associated with the video display device and is stored for the at least one individual, (ii) generate limited-capture video, including the encrypted video, when said object judging unit judges that the captured video includes video of the at least one individual, and (iii) output the captured video, when said object judging unit judges that the captured video does not include video of the at least one individual; and a video distribution unit operable to distribute one of the limited-capture video and the captured video to the video display device, the limited-capture video being generated by said limited-capture video generation unit, and the captured video being outputted by said limited-capture video generated unit.

* * * * *